US010987886B2

(12) United States Patent
Karuppusamy et al.

(10) Patent No.: US 10,987,886 B2

(45) Date of Patent: Apr. 27, 2021

(54) HYDRAULIC TIRE CURING PRESS APPARATUS AND A METHOD FOR ADJUSTING MOLD HEIGHT IN A HYDRAULIC TIRE CURING PRESS

(71) Applicant: L&T RUBBER PROCESSING MACHINERY, Tamil Nadu (IN)

(72) Inventors: Ganesh Raja Karuppusamy, Chennai (IN); Saravanakumar Murugesan, Tirunelveli (IN); Sreeraj Panayancheril Jayakumar, Alappuzha (IN); Ravichandran Velusamy, Kanchipuram (IN); Rajkumar Venugopal, Bodinayakanur (IN); Baskar Thiyagarajan, Kanchipuram (IN); Prabu Mani, Namakkal Dt. (IN); Durai Dharmaraj, Tirunelveli (IN); Aravamudhun Govindarajan, Chennai (IN); Emmanuel Rajendran, Tirunelveli (IN)

(73) Assignee: L&T RUBBER PROCESSING MACHINERY, Tamil Nadu (IN)

( * ) Notice: Subject to any disclaimer, the term of this patent is extended or adjusted under 35 U.S.C. 154(b) by 0 days.

(21) Appl. No.: 16/468,323

(22) PCT Filed: Mar. 27, 2018

(86) PCT No.: PCT/IN2018/050173

§ 371 (c)(1),
(2) Date: Jun. 11, 2019

(87) PCT Pub. No.: WO2019/012549

PCT Pub. Date: Jan. 17, 2019

(65) Prior Publication Data

US 2020/0130305 A1 Apr. 30, 2020

(30) Foreign Application Priority Data

Jul. 12, 2017 (IN) ............................ 201741024711

(51) Int. Cl.
*B29D 30/06* (2006.01)
*B29D 30/10* (2006.01)
(Continued)

(52) U.S. Cl.
CPC ......... *B29D 30/0601* (2013.01); *B29D 30/10* (2013.01); *B29D 30/28* (2013.01); *B29D 2030/0027* (2013.01); *B60C 25/00* (2013.01)

(58) Field of Classification Search
CPC ............ B29D 30/0601; B29D 30/0603; B29D 30/0605; B29D 30/0606; B29D 30/065;
(Continued)

(56) References Cited

U.S. PATENT DOCUMENTS 3,918,861 A 11/1975 Klose
6,506,040 B1 * 1/2003 Singh ................ B29D 30/0601 425/28.1

(Continued)

FOREIGN PATENT DOCUMENTS

EP 2 361 756 8/2011
EP 2 857 184 4/2015

(Continued)

*Primary Examiner* — Robert C Dye
*Assistant Examiner* — Sedef E Paquette
(74) *Attorney, Agent, or Firm* — Mark M. Friedman

(57) ABSTRACT

A curing press for tires includes an upper cavity having a vertically separable upper housing and a top mold. A lower cavity is mounted on a base and forms an arrangement to provide mold height adjustment during curing. The base includes a bottom bolster structure and a bottom mold. An indexing lock ring is rotatably arranged with the bottom bolster structure for closing or opening of the top and bottom molds. The bolster structure includes squeeze cylinders (Continued)

4 3 43 14 13 7 12 6 13 9 2 5 17 8 1b 18 1 1d 24 1a 1c 1c 23 having piston rods to provide mold height adjustment. A squeeze retract stop assembly is provided to restrict vertically downward movement of the bottom mold during a tire curing process. The press includes at least one locking lever and at least one indexing lock pin adapted to connect the at least one locking lever to lock holes in the bottom bolster structure wherein each lock hole corresponds to a particular mold height.

24 Claims, 19 Drawing Sheets

(51) Int. Cl.

| | |
|---|---|
| ***B29D 30/28*** | (2006.01) |
| *B29D 30/00* | (2006.01) |
| *B60C 25/00* | (2006.01) |

(58) Field of Classification Search

CPC . B29D 30/10; B29D 30/28; B29D 2030/0027

USPC .......................................................... 156/409

See application file for complete search history.

(56) References Cited

U.S. PATENT DOCUMENTS

| | | | | |
|---|---|---|---|---|
| 2004/0046286 A1* | 3/2004 | Seko | B29D 30/0629 | 264/326 |
| 2015/0079210 A1* | 3/2015 | Singh | B29D 30/0605 | 425/47 |
| 2016/0001513 A1* | 1/2016 | Bahlke | B29D 30/0601 | 264/40.5 |

FOREIGN PATENT DOCUMENTS

| | | |
|---|---|---|
| EP | 2 965 393 | 1/2016 |
| WO | 20140124623 | 8/2014 |

* cited by examiner

HYDRAULIC TIRE CURING PRESS APPARATUS AND A METHOD FOR ADJUSTING MOLD HEIGHT IN A HYDRAULIC TIRE CURING PRESS

TECHNICAL FIELD

The present invention relates generally to tire manufacturing using a tire curing press, and more particularly, to a hydraulic tire curing apparatus for utilization of shaping and curing tires with a plurality of circumferentially placed hydraulic cylinder arrangement.

BACKGROUND

In a tire curing press, the green tire refers to the uncured state of tire which is placed in special molds where all pattern and tread forming and side wall labelling of the tire occurs during its curing. The molds are comprised of two pieces in tire curing presses, namely top half and bottom half which are fastened within the structures of the tire curing press.

Typically, there are two types of tire curing presses depending on the methods to maintain the pressure on the molds, namely mechanical and hydraulic. In mechanical presses, the top mold is locked onto the bottom mold mechanically by bull gear and the internal pressure is maintained. While, in hydraulic presses, the mold is kept under pressure by an individual or a plurality of hydraulic cylinder continuously.

For curing different sizes of tires (combination of different widths, outer diameters, bead widths etc.) within the same press, different molds of varying heights need to be accommodated in a tire curing press. The mold height adjustment assembly in a press, in general provides a method or an arrangement to vary the distance between the top and bottom heat plates in turn accommodating different mold heights in fully closed condition. In general, mold height adjustment assemblies have employed different mechanisms to vary or adjust the mold heights. Commonly used mold height mechanisms typically employ spacer of different heights, nut-screw mechanism, and lock plates-tie rod groove arrangement for mold height adjustment.

The conventional nut and screw mechanism uses the mentioned gearing arrangement. One of the heat plates, either the top or bottom are maintained stationary and the position of the other plate is varied by a nut and screw mechanism. Depending on the arrangement, a motor drives either the nut or the screw to achieve movement of the plates. Due to the limitations in manufacturing process, a clearance is usually associated with this arrangement which seriously compromises the positional accuracy of the mold. In addition to mentioned drawback, wearing due to metal to metal contact is a phenomenon associated with this arrangement which further increases the clearance. If precision needs to be instilled to the arrangement, complex manufacturing methods need to be adopted which significantly increases manufacturing and maintenance costs.

The existing mechanism has many drawbacks. They have more number of components and complex mechanisms are involved which in turn results in excessive time consuming. Nut and screw type mechanisms cause jamming in the long run. They also consume more power. In other existing mechanisms, two different types of squeeze cylinders in the same press is required which is a disadvantage. Further, squeeze cylinder removal is difficult for maintenance. In other mechanisms, separate mold height assembly is required.

In addition to the above, during the process of tire curing there is a possibility for the bottom mold to open when there is a loss in squeeze pressure in the hydraulic cylinders which presents an undesirable condition. Hence, there is also a need to avoid or restrict the opening of the bottom mold to eliminate the undesirable condition.

Thus, in view of the drawbacks of the existing techniques of vulcanization of tyres, it is realised that there is a need for mold height adjustment in hydraulic tire curing press wherein the mold height adjusting assembly is capable of accommodating tires of varying sizes, that overcome the prior art problems and prevent undesired movement of the bottom mold during the tire curing operation.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

The primary object of the present invention is to provide a device which along with the help of long stroke hydraulic squeeze cylinders eliminates the need for a separate mold height assembly.

Another object of the present invention is to provide a tire curing press with arrangement of squeeze cylinders, bottom bolster and squeeze cylinder spacer, squeeze cylinder spacer retainer for easy removal of squeeze cylinders for maintenance.

Yet another object of the present invention is to provide a tire curing press of arrangement of squeeze cylinders, squeeze cylinder spacer, squeeze cylinder pistons, piston rod spacer, piston rod spacer retainer, bottom heat plates and indexing barrel to eliminate separate mold height assembly.

Still another object of the present invention is to provide a locking mechanism associated with the mold height adjustment for locking the indexing barrel at the exact required angle such that the discrete vertical step engages with the piston rod spacer retainer. Piston rod spacer retainer is connected to bottom heating plates. On engagement of vertical steps in indexing barrel with piston rod spacer retainer further movement of bottom heating plate is prevented, thereby eliminating or limiting opening up of molds.

Accordingly, in one aspect, there is provided a hydraulic tire curing press apparatus for shaping and curing tires, wherein said apparatus comprising: an upper press cavity including a vertically separable upper housing, and a top mold fastened to the upper housing; a lower press cavity mounted on a base and capable of providing mold height adjustment during curing process, wherein said base comprises a bottom bolster structure, and a bottom mold, characterized in that said bottom bolster structure comprises: an indexing lock ring means rotatably arranged with said bottom bolster structure to facilitate engagement or disengagement of said top mold with said bottom mold; plurality of hydraulic squeeze cylinders, wherein each squeeze cylinder includes means to move the bottom mold thereby providing mold height adjustment; a squeeze retract stop assembly adapted to restrict downward movement of said bottom mold during a tire curing process; and a locking arrangement comprising at least one locking lever and at least one indexing lock pin, wherein said indexing lock pin is adapted to connect said locking lever to any one of lock holes in said bottom bolster structure, wherein each lock hole corresponds to a particular mold height.

In one aspect, the indexing lock ring has a bottom profile engaged to a groove in the bottom bolster structure and a top profile engaging with said upper housing and holding said upper housing (9) in position during tire curing.

In one aspect, the squeeze retract stop assembly comprises a plurality of indexing barrel means mounted on said bottom bolster structure and rotatably held in a position by a barrel retainer.

In one aspect, the indexing barrel includes plurality of vertical steps at different heights for different mold height adjustment.

In one aspect, each indexing barrel associated with indexing gear arrangement is coupled to an indexing ring gear.

In one aspect, means to move the bottom mold is a squeeze cylinder piston rod, which includes an extended flange portion that engages with a T-slot in a piston rod spacer.

In one aspect, said piston rod spacer includes a spacer flange that engages with piston rod spacer retainers.

In one aspect, each squeeze cylinder includes a squeeze cylinder spacer made up of a first split half fixed to said bottom bolster structure, and a second split half rotatably hinged to said first split half.

In one aspect, said piston rod spacer retainer includes an extended teeth and a split flange.

In one aspect, vertical steps of the indexing barrel comes in contact with said extended teeth to prevent further downward movement of the bottom mold.

In one aspect, said indexing lock pin means is locked with said lock hole to prevent further rotation of said indexing gear, said indexing ring gear, an indexing pinion, and said indexing barrel, and locks said indexing barrel at a required angle such that the discrete vertical step engages with an extended teeth of the piston rod spacer retainer.

In one aspect, said squeeze retract stop assembly comprises a plurality of indexing plate mounted with spacers of different heights for different mold height adjustment.

In one aspect, said squeeze retract stop assembly comprises an arrangement of plurality of cylindrical stopper blocks with different heights mounted to bottom heat plates.

In one aspect, the arrangement further comprises a sliding plate mounted with at least one squeeze retract stop means engaged with one of said cylindrical stopper blocks according to desired mold height.

In one aspect, the linear movement of said squeeze retract stop assembly fixed to the sliding plate, is achieved by the rotation of an actuator ring and connecting links.

In a second aspect, there is provided a hydraulic tire curing press apparatus for shaping and curing tires, wherein said apparatus comprising: an upper press cavity including a vertically separable upper housing, and a top mold fastened to the upper housing; a lower press cavity mounted on a base and capable of providing mold height adjustment during curing process, wherein said base comprises a bottom bolster structure, and a bottom mold, characterized in that said bottom bolster structure comprises: an indexing lock ring means rotatably arranged with said bottom bolster structure to facilitate engagement or disengagement of said top mold with said bottom mold; plurality of hydraulic squeeze cylinders, wherein each squeeze cylinder includes means to move the bottom mold thereby providing mold height adjustment; a squeeze retract stop assembly adapted to restrict downward movement of said bottom mold during a tire curing process, said squeeze retract stop assembly further comprises plurality of indexing barrels rotatably held by a indexing barrel retainer and fastened to said bottom bolster structure, wherein each indexing barrel includes a plurality of vertical steps at different heights for different mold heights, wherein, said vertical steps of the indexing barrel engages with extended teeth of a piston rod spacer retainer assembly to restrict the further downward movement of said bottom mold; at least one indexing pinion rotatably mounted on a indexing pinion bracket; and at least one ratchet adapted to rotate the indexing pinion, which in turn rotates said indexing barrel through a gear arrangement; and a locking arrangement comprising at least one locking lever and at least one indexing lock pin, wherein said indexing lock pin is adapted to connect said locking lever to any one of lock holes in said bottom bolster structure, wherein each lock hole corresponds to a particular mold height.

In the second aspect the gear arrangement includes plurality of indexing gears, each per indexing barrel, and said indexing gears coupled to an indexing ring gear.

In the second aspect the indexing ring gear is mounted using a set of ring pins with bearings which enables free rotation of said indexing ring gear.

In the second aspect, rotation of said indexing pinion enables rotation of said indexing ring gear thereby causing rotation of said indexing gears which in turn rotates said indexing barrel in position.

In the second aspect said piston rod spacer retainer includes an extended teeth and a split flange.

In the second aspect the vertical steps of the indexing barrel comes in contact with said extended teeth to prevent further downward movement of the bottom mold.

In the second aspect the locking lever is connected to at least one indexing gear in said gear arrangement and said indexing gear is connected to said indexing barrel by using a key.

In a third aspect, there is provided a method for adjusting mold height in a hydraulic tire curing press apparatus, said method comprising: lifting an upper housing along with a top mold to fully opened position, to load a green tire into a bottom mold; moving said upper housing downward and locking said upper housing upon reaching a desired position; lifting bottom mold vertically for enabling contact of said bottom mold with said top mold; restricting downward movement of said bottom mold by a squeeze retract stop assembly; and locking a locking lever to any one of lock holes in said bottom bolster structure, wherein each lock hole corresponds to a particular mold height.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE ACCOMPANYING DRAWINGS

The above and other aspects, features, and advantages of certain exemplary embodiments of the present invention will be more apparent from the following description taken in conjunction with the accompanying drawings in which.

Figure 1:
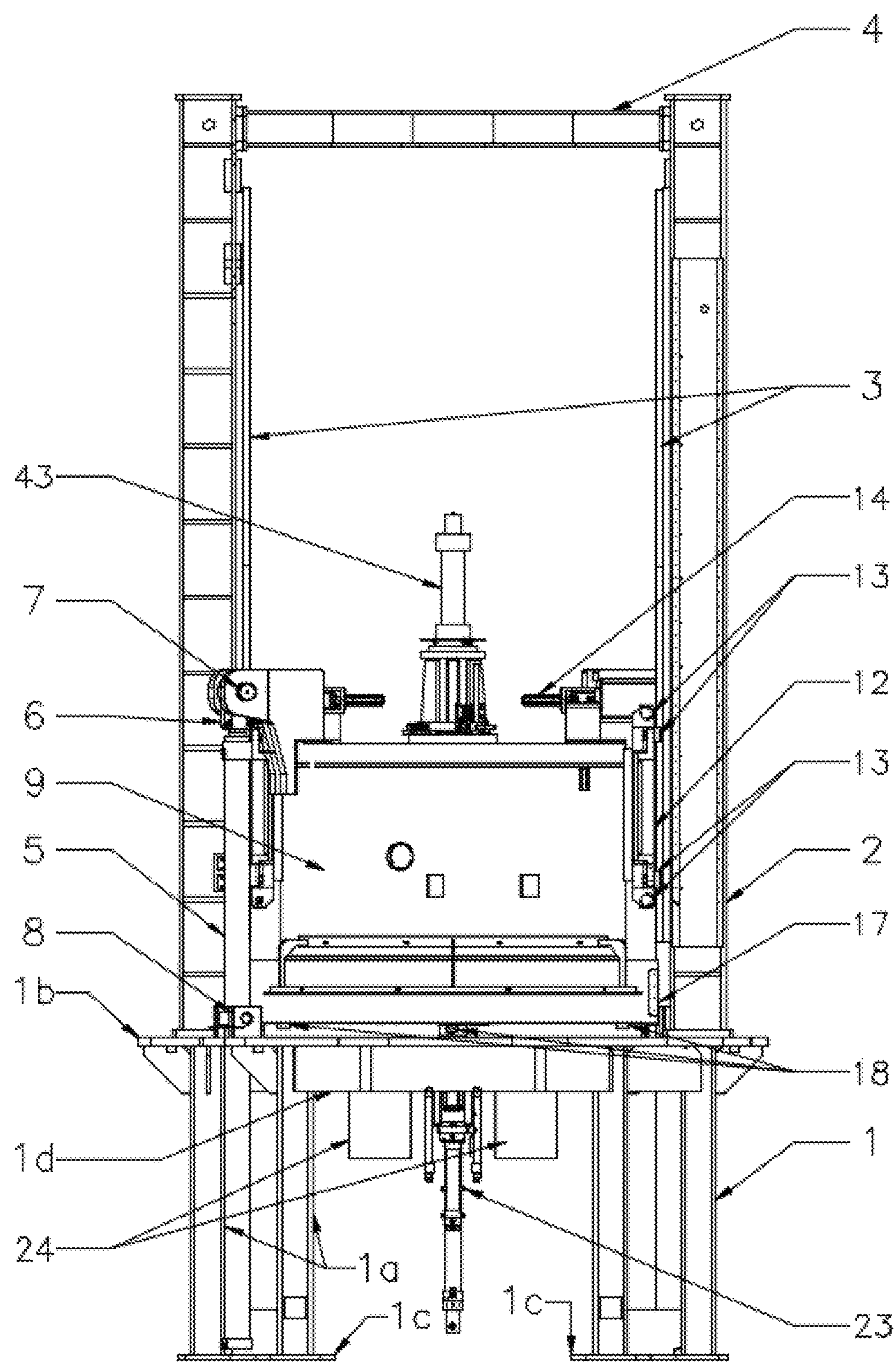
FIG. 1 illustrates the front view of the tire curing press with press in full closed condition, according to one implementation of the present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF THE PRESENT INVENTION

The following description with reference to the accompanying drawings is provided to assist in a comprehensive understanding of exemplary embodiments of the invention. It includes various specific details to assist in that understanding but these are to be regarded as merely exemplary. Accordingly, those of ordinary skill in the art will recognize that various changes and modifications of the embodiments described herein can be made without departing from the scope of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms “a”, “an”, and “the” include plural referents unless the context clearly dictates otherwise.

By the term “substantially” it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Features that are described and/or illustrated with respect to one embodiment may be used in the same way or in a similar way in one or more other embodiments and/or in combination with or instead of the features of the other embodiments.

It should be emphasized that the term “comprises/comprising” when used in this specification is taken to specify the presence of stated features, integers, steps or component but does not preclude the presence or addition of one or more other features, integers, steps, components or groups thereof.

The present invention relates to apparatus for utilization of shaping and curing tires with a plurality of circumferentially placed hydraulic cylinder arrangement. The invention relates to a class of industrial machinery which presents an opportunity to provide heating media with high pressure such as hot water or steam or nitrogen that are internally applied into the curing bladder pushing the green tire circumferentially towards the edges of the mold by stretching the bladder. Meanwhile, the mold is heated from outside on the top and bottom surfaces by heating platens and on the circumference by heating jackets in the mold. Thus, the tire takes the shape within the confines of the mold under pressure and temperature for predefined time period. Hence the apparatus has in its structure the provision to secure tire molds which forms the cured tire.

Additionally, in the present invention the tire curing press with the help of long stroke hydraulic cylinders is able to provide linear displacement to the mold with the capacity to open and close it for the placement and removal of either green or cured tire. The present invention has provision to load which is to place a green tire into the mold and unload the cured tire from the mold with the help of auxiliary sub-assemblies.

In one implementation, there is provided an arrangement in hydraulic tire curing press so as to achieve mold height adjustment, the arrangement comprising: base, bottom bolster, upper housing, guide columns, squeeze cylinders, indexing barrels and lock rings. It additionally comprising: squeeze cylinder spacer, squeeze cylinder pistons, piston rod spacer, and piston rod spacer retainer, bottom heat plates, to eliminate separate mold height assembly.

In one implementation, the current apparatus utilizes long stroke hydraulic squeeze cylinders that eliminates the need for a separate mold height assembly. The current apparatus presents an arrangement which uses an indexing barrel means with a plurality of vertical steps at different heights for different mold height adjustment. The steps of the indexing barrel engage with a retracting stop arrangement mounted to the bottom heat plates. When the steps of the indexing barrel come in contact with the arrangement mounted to the bottom heat plates restrict the further downward movement of the heat plates and thereby the bottom mold. In case of a plurality of squeeze cylinders used for providing squeeze load, an indexing barrel is associated with each cylinders. A drive arrangement is utilized to couple the plurality of indexing barrels and to maintain precise angular position of each indexing barrel such that the correct vertical step engages with the retracting stop arrangement mounted to the bottom plates. A locking mechanism is also associated with the retracting stop arrangement for locking the indexing barrel at the exact required angle such that the discrete vertical step engages with the retracting stop arrangement presenting mold height adjustment. Upon unlocking and further rotating, the indexing barrel can be rotated and set to another position for achieving a different vertical step to be engaged to the retracting stop arrangement depending on the mold height.

In one implementation, additional to the indexing barrel, the squeeze cylinders can be fastened to a bottom bolster which is locked to an indexing ring. The upper housing which holds the top heat plates is locked to the indexing ring by its rotation. The combination of the two arrangements, i.e. the indexing ring and upper housing and the indexing barrel and squeeze cylinder piston rods, piston rod spacers & piston rod spacer retainers can be used simultaneously to achieve the desired mold height between the top and bottom heat plates.

Figure 2:
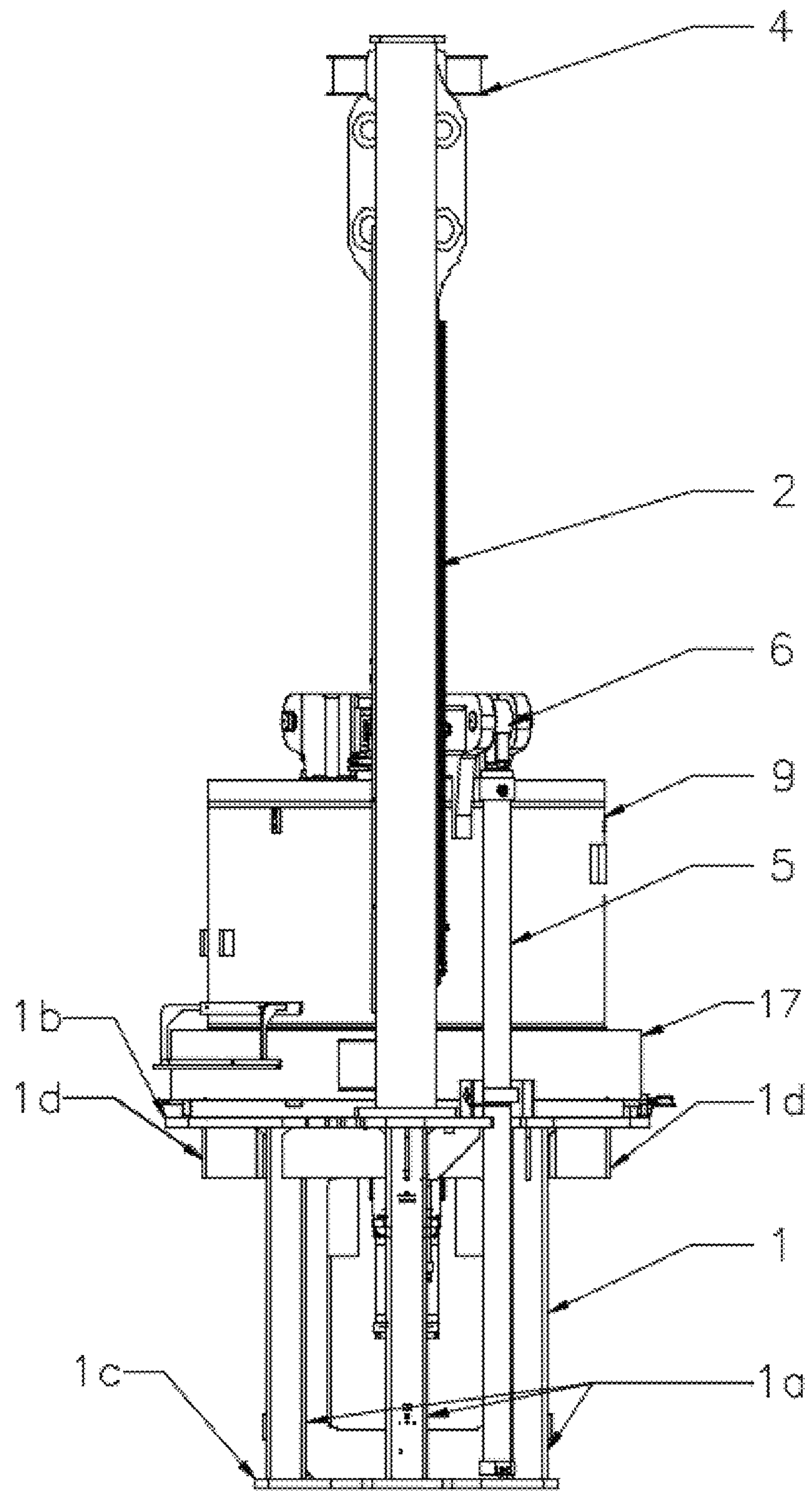
FIG. 2 illustrates the side view of the tire curing press with press in full closed condition, according to one implementation of the present invention.
Figure 3:
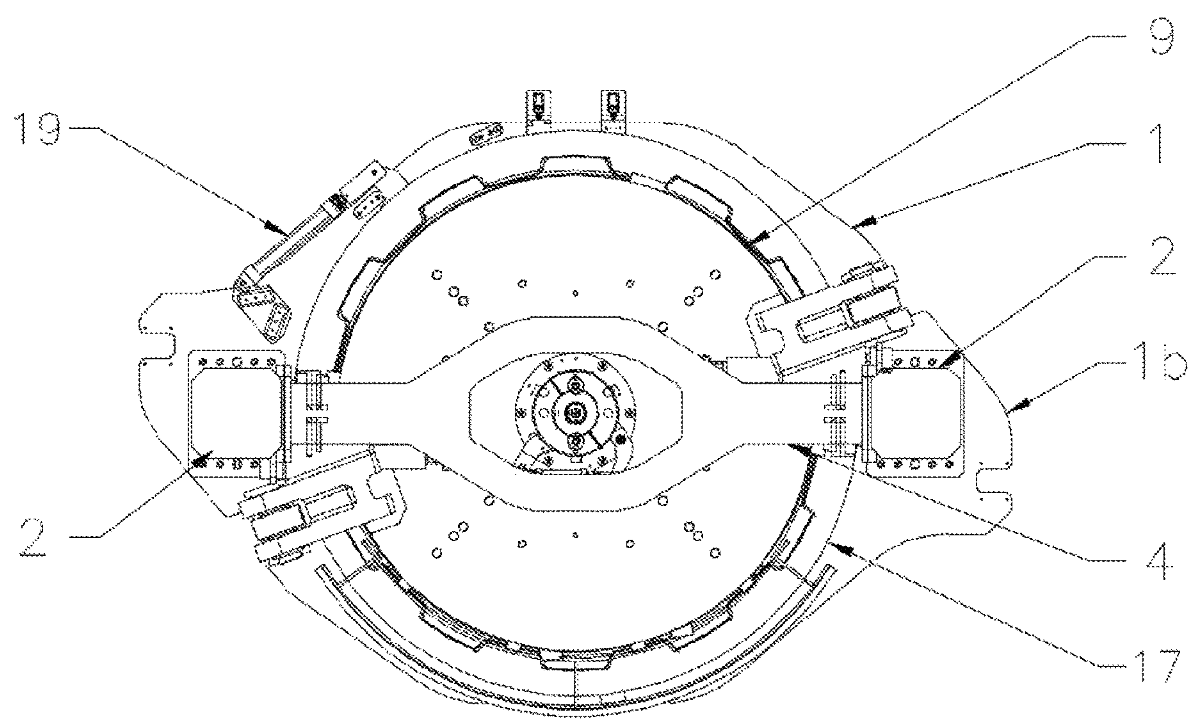
FIG. 3 illustrates the top view of the tire curing press with press in full closed condition, according to one implementation of the present invention.
Figure 4:
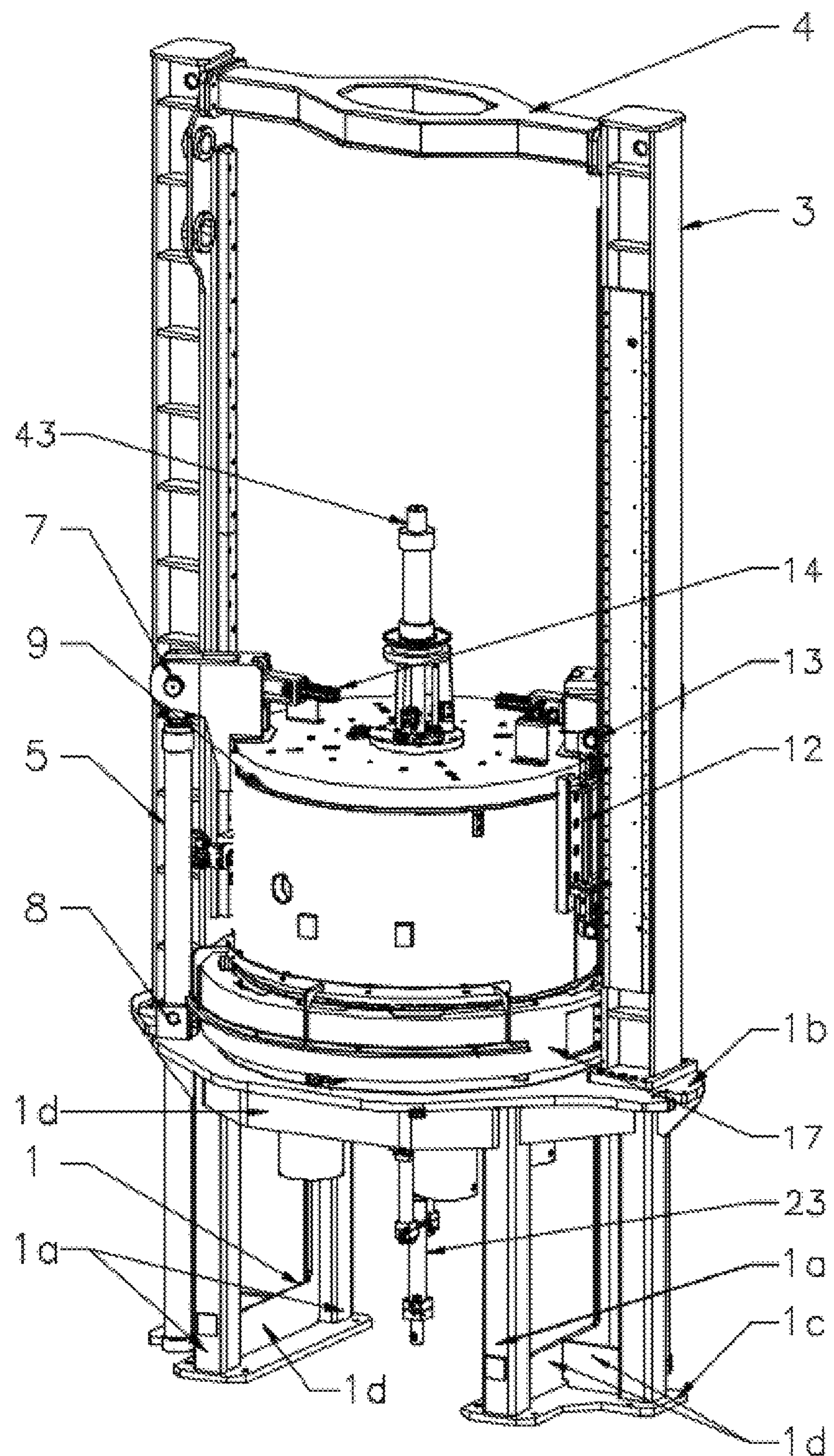
FIG. 4 illustrates the isometric view of the tire curing press with press in full closed condition, according to one implementation of the present invention.

In one implementation, referring to FIGS. 1-19, the components of the present invention as given in the figures are individually numbered as follows:

1. Base
  a. Square Tube
  b. Top plate
  c. Bottom plates
  d. Ribs
2. Guide Column
3. Guide Rails
4. Tie Bar
5. Lift Cylinder
6. Rod end bearing/couplers
7. Lift Cylinder Pin
8. Lift Cylinder Trunnion Mounting
9. Upper Housing
10. Top Heat Plates
11. Top Mold
12. Roller Mounting Bracket
13. Guide Roller
14. Lock Cylinder
15. Lock Pin
16. Lock Cylinder Bracket
17. indexing ring/lock Ring
18. Lock Ring Rollers
19. Ring Indexing Cylinder
20. Bottom Bolster
  a. Lock holes
21. Bottom Heat Plates
22. Bottom Mold
23. Bladder Control Mechanism
24. Squeeze Cylinder
25. Squeeze Cylinder Piston rod
  a. Extended Flange
26. Squeeze Cylinder Spacer
  a. First split half
  b. Second split half
27. Piston Rod Spacer
  a. T Slot
  b. Spacer Flange
28. Piston Rod Spacer Retainer
  a. Extended teeth
  b. Split flange
29. Indexing Barrel
30. Barrel Retainer
31. Bush
32. Indexing Gear
33. Indexing Ring Gear
34. Locking Lever
35. Indexing lock Pin
36. Ring Pin with bearing
37. Indexing Pinion
38. Ratchet
39. Indexing Pinion Bracket
40. Bearing
41. Bottom Guide
42. Guide Bush
43. Segmented Mold Operator
44. Upper Housing stopper blocks
45. Hinge Pin In an alternate implementation of the present invention, the components as shown in FIGS. 11-18 are individually numbered as following:

46. Stopper Blocks
47. Sliding Plate
48. Squeeze Retract Stop
49. Actuator Ring/connecting ring
50. Connecting links
51. Plate Guides
52. Indexing Lever
53. Lever Lock Pin
54. Slide Plate
55. Retract Stops
56. Stopper Blocks
57. Indexing Plate
58. Spacers In one implementation, the FIG. 1 illustrates front view of the tire curing press with press in closed condition, and FIG. 2 illustrates the side view of the tire curing press with press in full closed condition. The FIG. 3 illustrates top view of the tire curing press with press in full closed condition. The FIG. 4 illustrates the isometric view of the tire curing press with press in full closed condition.

Figure 5:
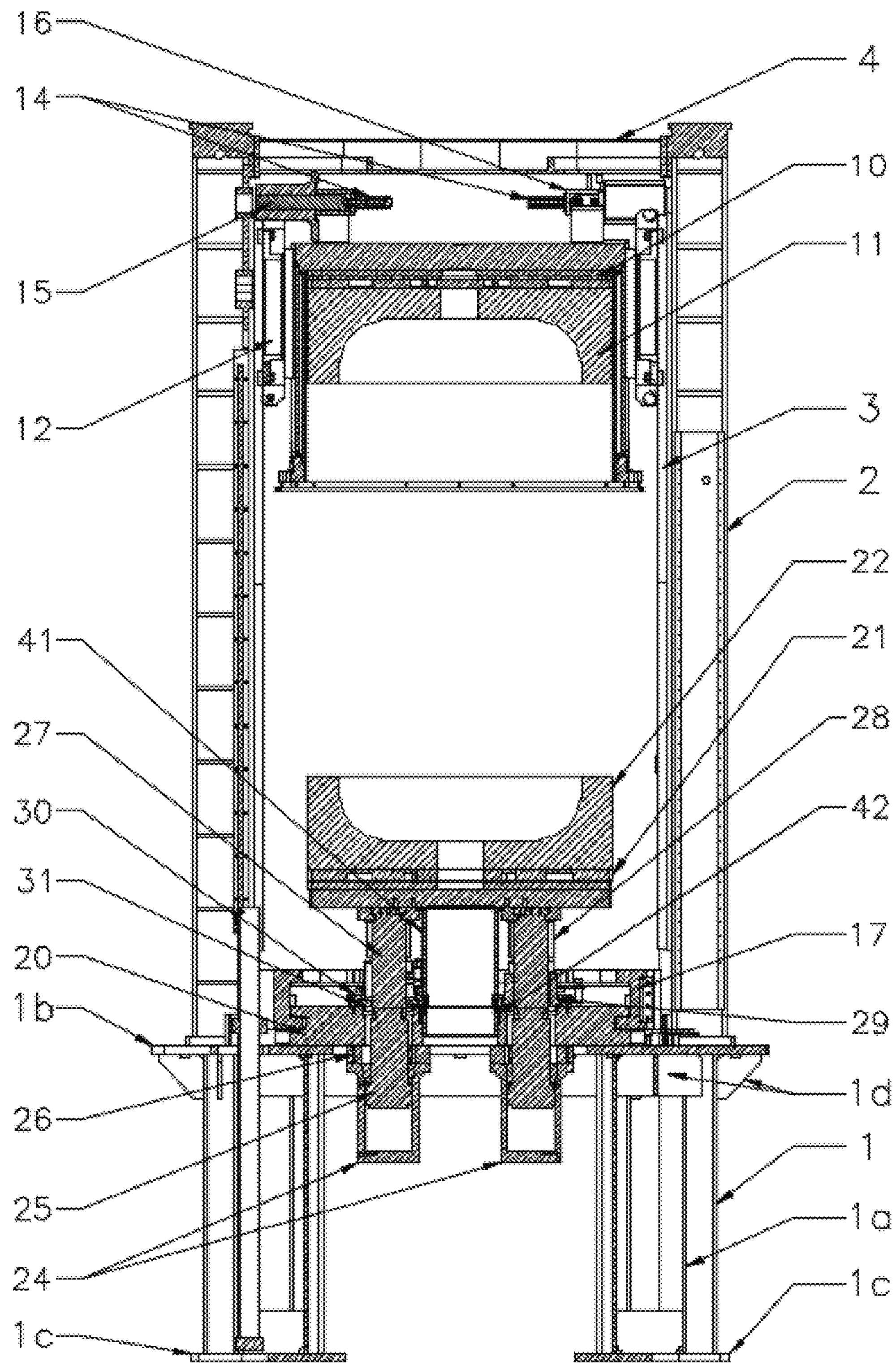
FIG. 5 illustrates the offset cross sectional view of the tire curing press with press in full open condition, according to one implementation of the present invention.

In one implementation, the FIG. 5 illustrates the offset cross sectional view of the tire curing press with press in full open condition.

Figure 6:
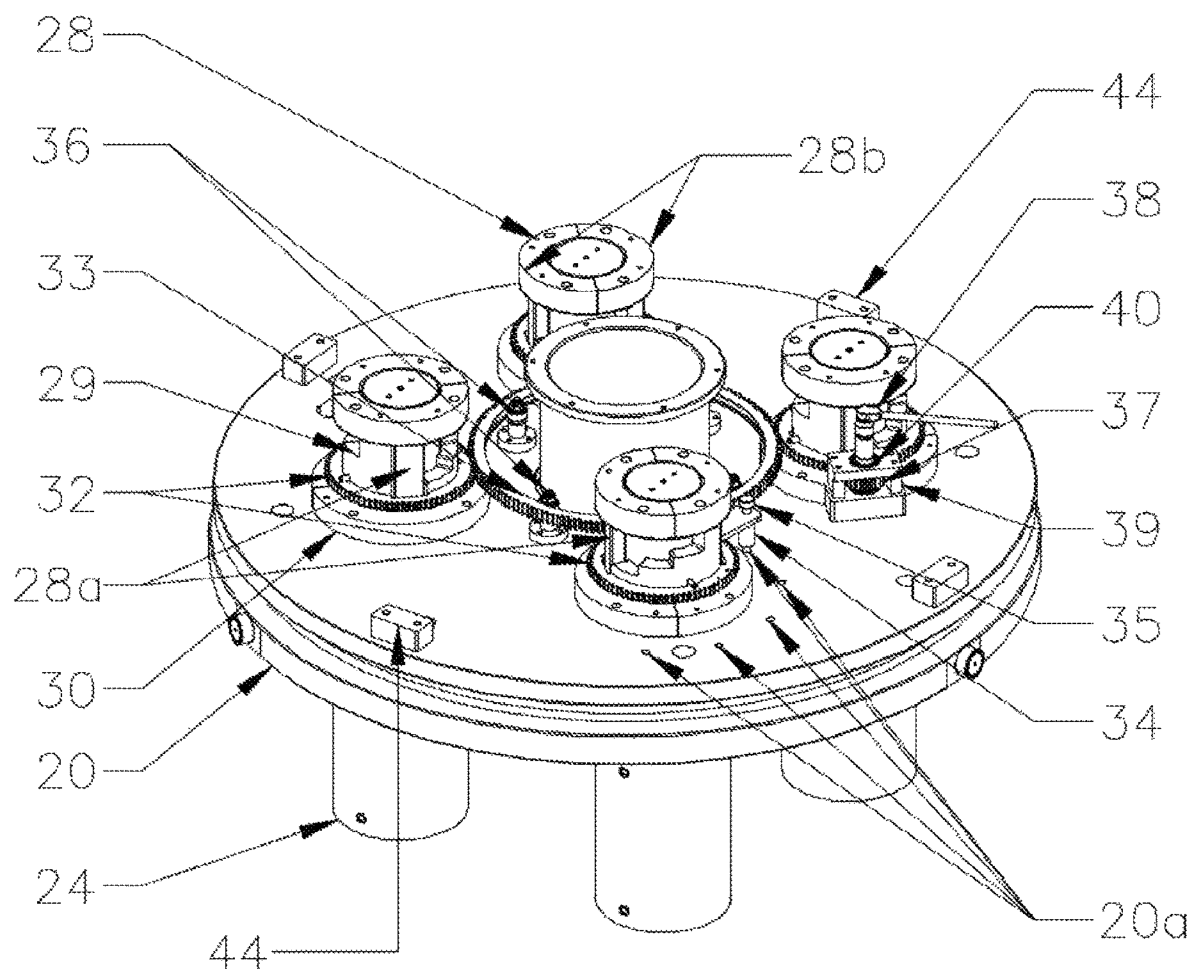
FIG. 6 illustrates the isometric view of the squeeze retract stop assembly according to one implementation of the present invention.
Figure 7:
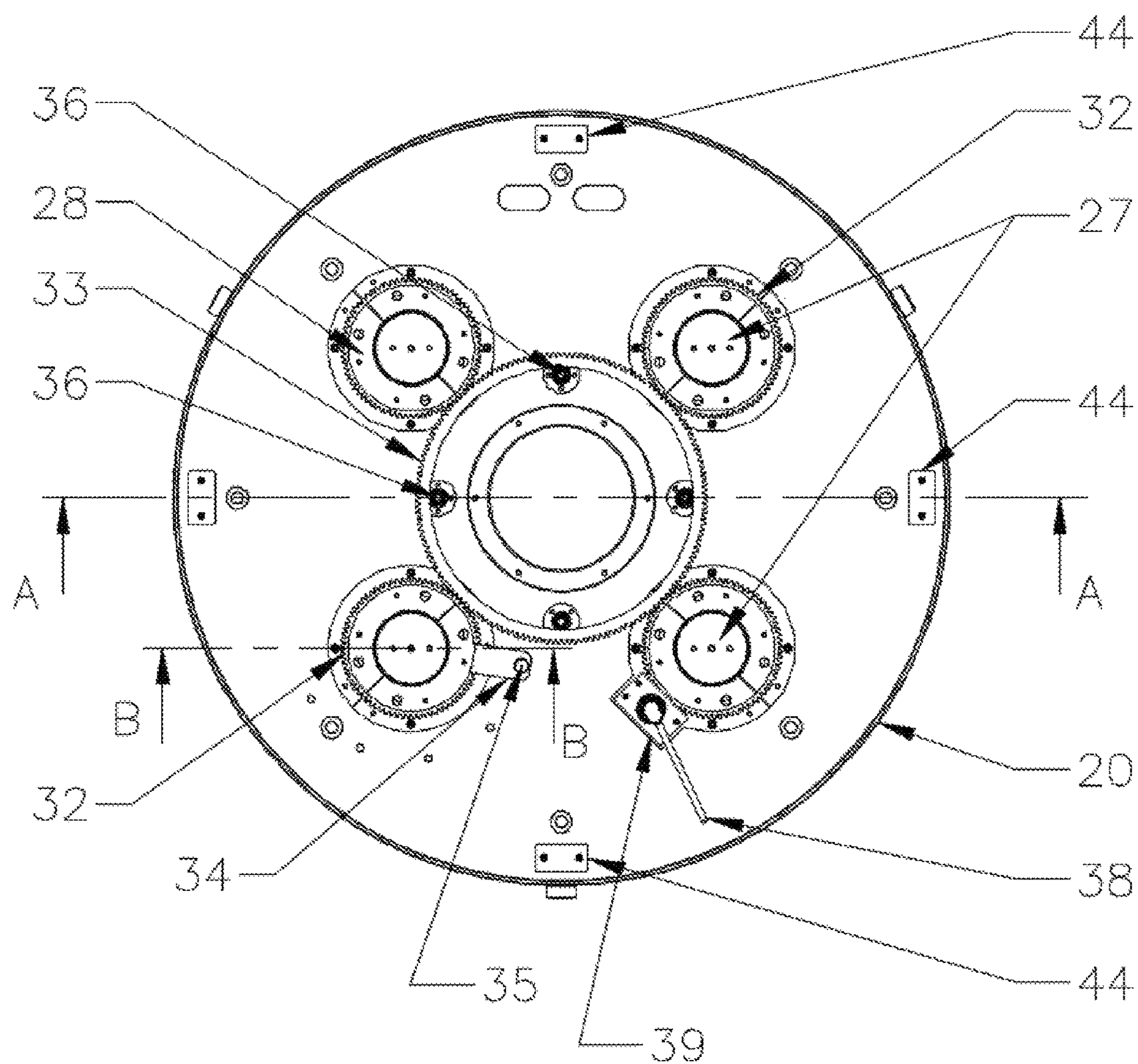
FIG. 7 illustrates the top view of the squeeze retract stop assembly according to one implementation of the present invention.
Figure 8:
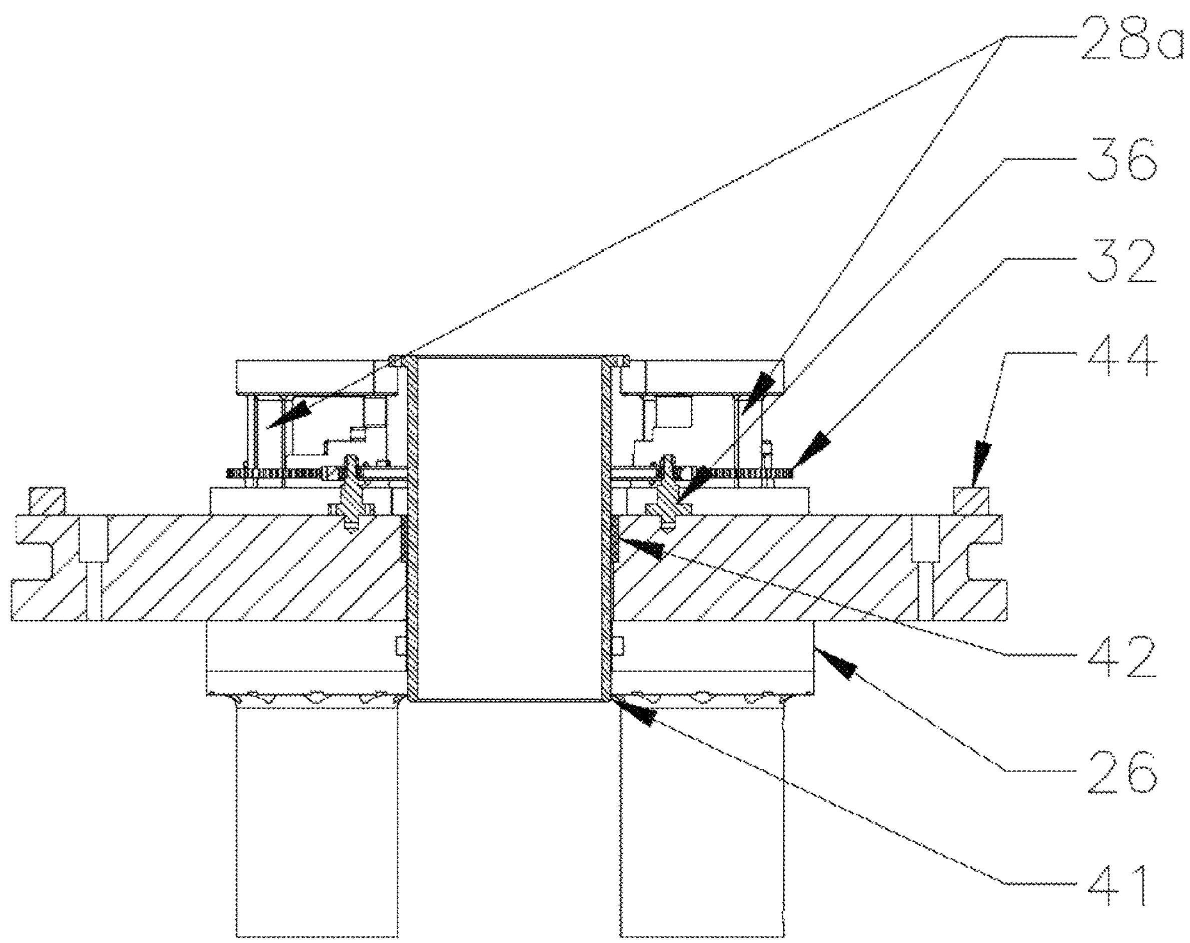
FIG. 8 illustrates the Cross-section A-A of FIG. 7, according to one implementation of the present invention.
Figure 9:
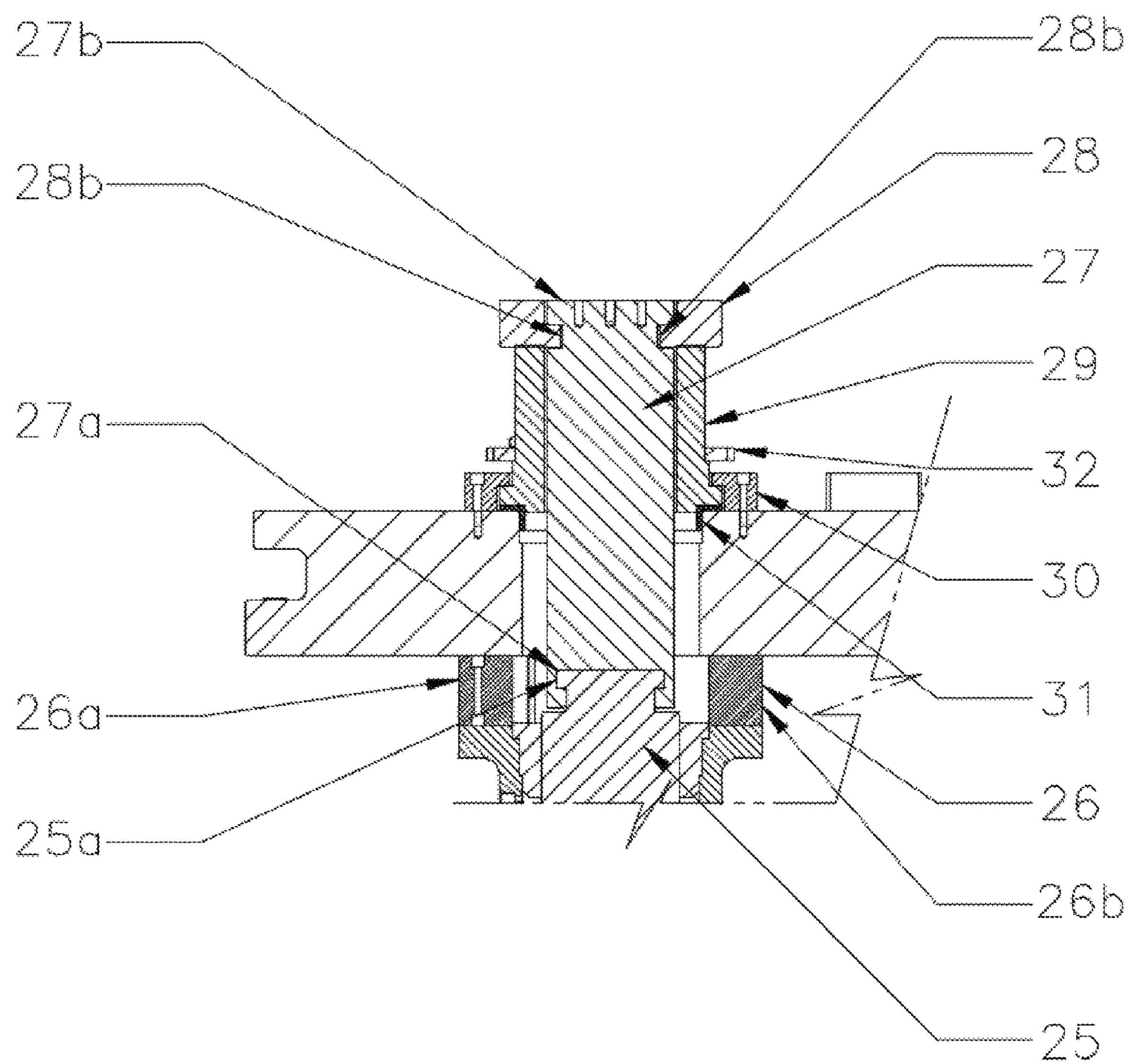
FIG. 9 illustrates Cross-section B-B of FIG. 7, according to one implementation of the present invention.

In one implementation, the FIG. 6 illustrates the isometric view of the squeeze retract stop assembly. The FIG. 7 illustrates top view of the squeeze retract stop assembly. The FIGS. 8 and 9 illustrates the cross-section A-A and cross-section B-B respectively.

Figure 10:
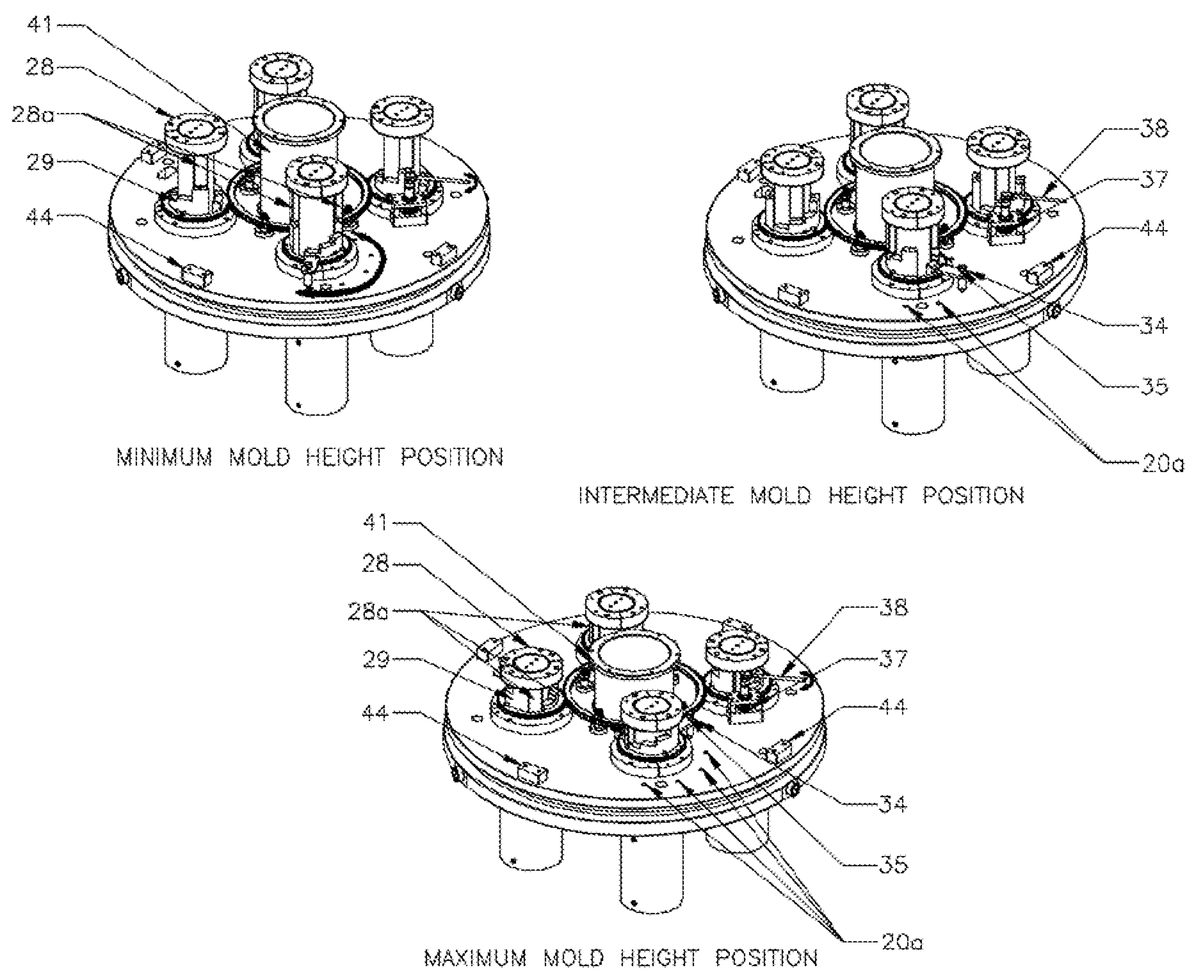
FIG. 10 illustrates adjustment of Indexing Barrel to achieve different mold height positions, according to one implementation of the present invention.

In one implementation, the FIG. 10 illustrates the adjustment of Indexing Barrel to achieve different Mold Height Positions.

In one implementation, as shown in FIGS. 1-10, the tire curing press for vulcanization of tires comprises of at least one base (1) onto which the all the other assemblies are mounted. The base includes at least a top plate (1*a*), which is supported by at least six square tubes 1*b*), a bottom plate (1*c*) which connects at least three square tube (1*b*) and plurality of ribs/plates (1*d*) which connects top plate (1*a*), square tubes (1*b*) and bottom plate (1*c*), all of which may be welded together to form a single part. The press also includes at least two guide columns (2) which forms the guiding structure of the upper housing during press opening and closing. At least two sets of guide rails (3) is mounted to the guide columns (2) and at least one tie bar (4) supports the guide columns (2).

At least two lift hydraulically operated cylinders (5) operate in tandem to provide movements to the upper housing (9). At least two rod end couplers (6) connect the lift cylinders (5) to the upper housing (9) with at least two lift cylinder pins (7). At least two sets of trunnion mountings (8) connects the lift cylinder (5) to the base (1). At least one upper housing (9) contains the top heat plates (10) and top mold (11). At least one set of top heat plates (10) is made up of an arrangement of heating platen and insulation.

At least two roller mounting brackets (12) is fastened to the upper housing (9). A plurality of guide rollers (13) guide the upper housing (9). At least two lock cylinders (14) lock the upper housing (9) in position and at least two lock pins (15) is provided, one per lock cylinder (14). Further, at least two lock cylinder brackets (16) is provided, one per lock cylinder (14).

At least one lock ring (17) locks the upper housing (9) to the bottom bolster (20) during curing. A plurality of lock ring rollers (18) is provided to guide the lock ring (17) during rotation. At least one ring indexing cylinder (19) rotates the lock ring (17).

The press also includes a bottom bolster structure (20). At least one set of bottom heat plates (21) is made up of an arrangement of heating platen, insulation and support plate.

The press also includes at least one bottom mold (22) and at least one bladder control mechanism (23) that provides functioning of bladders in the tire mold and for stripping of cured tire after curing from the bottom mold (22).

At least four squeeze cylinders (24) are provided for achieving closing force during tire curing. Each squeeze cylinder (24) is provided with a squeeze cylinder piston rod (25). An extended flange portion (25*a*) is an integral part of squeeze cylinder piston rod (25). Each squeeze cylinder (24) includes a squeeze cylinder spacer (26). The squeeze cylinder spacer (26) includes a first split half (26*a*) and second split half (26*b*) hinged together by a hinge pin (45). Each squeeze cylinder further comprises a piston rod spacer (27). A T-slot (27*a*) and spacer flange (27*b*) form an integral part of piston rod spacer (27). Each piston rod spacer (27) includes a piston rod spacer retainer (28). The piston rod spacer retainer (28) is made of two split halves, each split half has an extended teeth (28*a*) and split flange (28*b*).

The bottom bolster structure (20) includes at least four indexing barrels (29). Barrel retainer (30) is provided for each indexing barrel (29). Each indexing barrel (29) also includes a bush (31). An indexing gear (32) is provided to each indexing barrel (29). The arrangement also includes at least one indexing ring gear (33). A locking lever (34) is held in position by an indexing lock pin (35). The indexing ring gear (33) is mounted to a set of ring pins with bearings (36) which are in turn fastened to the bottom bolster. The indexing ring gear (33) engages with indexing pinion (37). A ratchet (38) is used to operate the indexing pinion (37). The rotation of an indexing pinion (37) mounted on a indexing pinion bracket (39) fitted with a bearing (40) rotates the indexing ring gear (33) and thereby the indexing gears (32) which rotates the indexing barrel (29) in position. The movement of the bottom heat plates (21) is guided by a bottom guide (41) fixed to it and a guide bush (42) mounted on the bottom bolster structure (20)

At least four upper housing stopper blocks (44) are provided to maintain parallelism of upper housing in full close condition In one implementation, as shown in FIG. 1-4, the lift cylinders (5) are mounted to the base (1) by sets of lift cylinder trunnion mountings (8). The lift cylinder (5) can be connected to the upper housing (9) through rod end bearing (6) and lift cylinder pin (7). Both the lift cylinders (5) can be 180° apart. The upper housing (9) will be connected to the two roller mounting brackets (12) which each houses six guide rollers (13). The top heat plates (10) and top mold (11) are fastened to the upper housing (9). A set of guide rails (3) can be mounted to each guide column (2) which are mounted on the base (1). The tie bar (4) occupies the space between the two guide columns (2) and supports them.

In one implementation, the opening and closing operation of the press is ensured when a hydraulic pressure operates the lift cylinders (5) thereby moving the upper housing (9) either up or down guided by the guide rail (3) and guide roller (13) arrangement. During full press open the lock cylinder (14) fastened to the lock cylinder bracket (16) assembled to the upper housing (9) operates the lock pin (15) which engages to the guide columns (2) holding the upper housing (9) in place.

In one implementation, the bottom bolster structure (20) is fastened to the base (1) of the present apparatus. The indexing ring/lock ring means (17) has two profiles by design, the bottom profile engages to a groove in the bottom bolster (2). The top profile of the lock ring (17) has a bayonet lock type construction which engages with a similar construction of the upper housing (9). The upper housing (9) can be held in position during tire curing by the lock ring (17). When the ring indexing cylinder (19) is operated, the lock ring means (17) guided by the lock ring guide rollers (18) rotates. The squeeze cylinders (24) along with the squeeze cylinder spacers (26) are fastened to the bottom bolster (20). The squeeze cylinder piston rod (25) can connected to the bottom heat plates (21) through a piston rod spacer (27) and piston rod spacer retainer (28) assembly. Hence, a hydraulic pressure when applied to the squeeze cylinder (24) moves the squeeze cylinder piston rod (25) and in turn the bottom heat plates (21) and bottom mold (22) vertically. The bladder control mechanism (23) is fastened to the bottom heat plates (21), thus any movement provided to the bottom heat plates (21) is translated to its movement. The movement of the bottom heat plates (21) is guided by a bottom guide (41) fixed to it and a guide bush (42) mounted on the bottom bolster structure (20).

In the implementation, as shown in FIG. 9, the piston rod spacer retainer (28) may be fastened to bottom heating plate and also the split flanges (28*b*) of piston rod spacer retainer (28) engages with spacer flange (27 *b*) which is an integral part of piston rod spacer (27). Piston rod spacer (27) engages with squeeze cylinder piston rod (25), to restrict the further downward movement of the bottom mold. The stroke achieved by the squeeze cylinder (24) covers the entire range required to achieve the required mold height adjustment.

In one implementation, with the press in full open condition, as shown in FIG. 5, the green tire can be loaded into the bottom mold (22). For curing the tire, the lift cylinder (5) operates to move the upper housing (9) vertically down.

When the upper housing (9) reaches down and stopped by upper housing stopper blocks (44), it reaches the precise position & the ring indexing cylinder (19) operates to rotate the lock ring (17). At this instant, the upper housing (9) bayonet lock profile are in position to engage with the bayonet lock profile of the lock ring (17). The squeeze cylinder (24) operates moving the bottom mold (22) vertically up until it comes in contact with the top mold (11). Now, an internal pressure from the bladder control mechanism (23) cures the tire within the confines of the top and bottom molds marking the start of tire curing. The squeeze cylinders (24) apply the required closing force to prohibit any opening between the molds. Similarly, during curing, the upper housing (9) is held in position by the lock ring (17) preventing openings between molds. At the end of tire curing, the squeeze cylinder (24) retracts, the lock ring (17) unlocks the upper housing (9) and the lift cylinders (5) operates to open the press. The lock pin (15) is operated to lock the upper housing (9) to the guide columns (2). The cured tire is ready to be unloaded from the bottom mold (22).

In one implementation, as shown in FIG. 9, the squeeze cylinders (24) along with the squeeze cylinder spacers (26) are fastened to the bottom bolster (20). The extended flange (25 *a*) portion of the squeeze cylinder piston rod (25) engages with T slot (27 *a*) in piston rod spacers. Spacer Flange (27 *b*) at the other end of piston rod spacer (27) engages with piston rod spacer retainer (28). Squeeze cylinder spacer (26) is made up of two split halves, first split half (26*a*) is fixed to bottom bolster by fasteners. Second split half (26*b*) is hinged to first split half. Second split half can be rotated around hinge pin (45) by a handle welded to it. Once rotated, squeeze cylinder (24) can be removed from the second split half side, after removing fasteners. For assembling it back, squeeze cylinder (24) to be pushed from side till the extended flange (25*a*) engages with the T slot (27*a*) in piston rod spacer (27). The second split half (26*b*) can be closed back and squeeze cylinder (24) along with squeeze cylinder spacer (26) can be fastened to bottom bolster (20).

In one implementation, with the press in full open condition, as shown in FIG. 5, the green tire can be loaded into the bottom mold (22). For curing the tire, the lift cylinder (5) operates to move the upper housing (9) vertically down. When the upper housing (9) reaches down and stopped by at least upper housing stopper blocks (44) which ensure parallelism of upper housing to lock ring, it reaches the precise position and the ring indexing cylinder (19) operates to rotate the lock ring (17). At this instant, the upper housing (9) bayonet lock profile are in position to engage with the bayonet lock profile of the lock ring (17).

In one implementation, the piston rod spacer retainer (28), made up of two split halves, as shown in FIG. 6, and has an extended teeth (28A) per split half in its construction which engages with the vertical steps of the indexing barrel (29) to prevent further downward movement of the bottom mold (22) and thereby keeping it to a minimum to prevent any undesirable condition. An additional locking mechanism associated with the arrangement for locking the indexing barrel (29) at the exact required angle such that the discrete vertical step engages with the piston rod spacer retainer (28). The indexing ring (17) and upper housing (9) and the indexing barrel (29) and squeeze cylinder piston rods (25), piston rod spacer (27), piston rod spacer retainer (28) is used simultaneously to achieve the desired mold height between the top heat plate (10) and bottom heat plate (21).

In one implementation, the locking mechanism may comprised of at least one locking lever (34) and at least one indexing lock pin (35) as shown in FIG. 6. Indexing lock pin (35) connects locking lever (34) to any one lock hole (20*a*) in bottom bolster (20). Every lock hole (20*a*) corresponds to a particular mold height. Locking lever (34) is fastened to any one indexing ring gear (33). Indexing ring gear (33) is keyed to indexing barrel (29). All the indexing ring gears (33) engages with indexing gear (32). And any one indexing ring gear (33) engages with indexing pinion (37).

Thus when the indexing lock pin (35) is locked with any lock hole (20*a*), it prevents further rotation of indexing gear (32), indexing ring gears (33), indexing pinion (37) and indexing barrel (29) & at the same time locks the indexing barrel (29) at the exact required angle such that the discrete vertical step engages with the piston rod spacer retainer (28).

In one implementation, the squeeze retract stop assembly restrict the vertically downwards movement of the bottom mold (22) and keep it to a minimum when there is loss of squeeze pressure in the squeeze cylinders (24). As shown in FIG. 6-10, an indexing barrel (29) is mounted to the bottom bolster (20) and is held in position by a barrel retainer (30). An indexing barrel (29) is associated with each squeeze cylinder (24). The design of the indexing barrel (29) is such that vertical steps at different heights are provided for different mold heights. The piston rod spacer retainer (28) made up of two split halves has an extruded teeth (28*a*) per split half in its construction which comes into contact with the vertical steps of the indexing barrel (29) to prevent further downward movement of the bottom mold (22) and thereby keeping it to a minimum to prevent any undesirable condition. Each indexing barrel (29) is mounted over a bush (31) which provides smoother indexing operation. All indexing gears (32) associated with every indexing barrel (29) is coupled to a indexing ring gear (33). The indexing ring gear (33) is mounted to a set of ring pins with bearings (36) which are in turn fastened to the bottom bolster. The ring pins with bearings (36) allow the free rotation of the indexing ring gear (33). The rotation of an indexing pinion (37) mounted on a indexing pinion bracket (39) fitted with a bearing (40) rotates the indexing ring gear (33) and thereby the indexing gears (32) which rotates the indexing barrel (29) in position. A ratchet (38) is used to operate the indexing pinion (37). A locking lever (34) and a indexing lock pin (35) are used to hold all the indexing barrels (29) in position. The indexing lock pin (35) has to be removed during indexing of barrel & the indexing lock pin (35) has to be fitted once the desired vertical step position is reached.

In the implementation, during tire curing operation, upon unlocking of said indexing ring means, the indexing barrel means rotated and set to a position corresponding to said mold height, wherein, said steps of the indexing barrel means engages with said extended teeth of piston rod spacer retainer. Piston rod spacer retainer is fastened to bottom heating plate & also the split flanges of piston rod spacer retainer engages with spacer flange which is an integral part of piston rod spacer. Piston rod spacer engages with squeeze cylinder piston rod.

The advantages of an indexing barrel mechanism over the nut-screw or spacer arrangement is that, a relatively low setup time is required for achieving different mold heights and lesser inventory of parts required. In addition to the indexing barrel, the squeeze cylinders are fastened to a bottom bolster which is locked to an indexing ring. The upper housing which holds the top heat plates is locked to the indexing ring by its rotation. The combination of the two arrangements, i.e. the indexing ring and upper housing and the indexing barrel, squeeze cylinder piston rods, piston rod spacers and piston rod spacer retainers is used simultaneously to achieve the desired mold height between the top and bottom heat plates.

Figure 11:
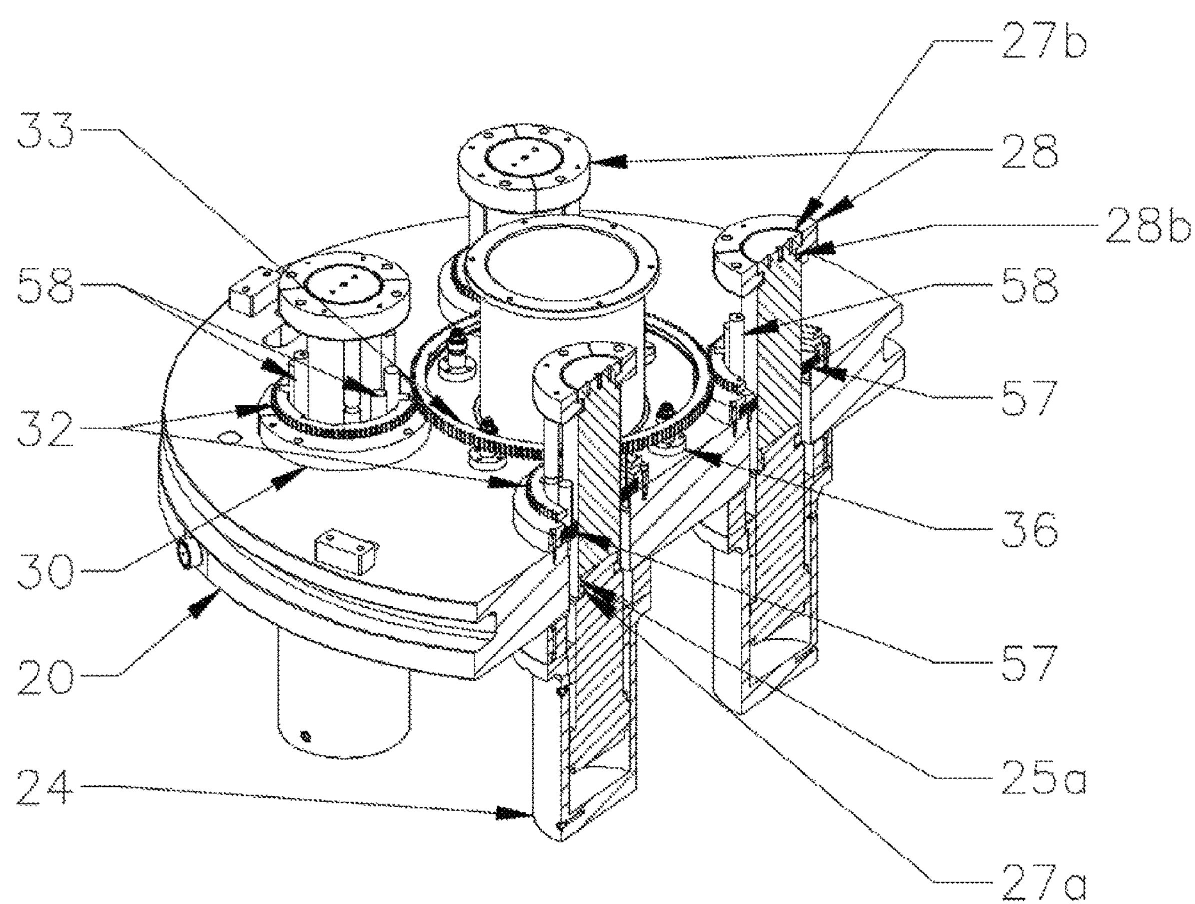
FIG. 11 illustrates isometric view of the squeeze retract stop assembly, according to second implementation of the present invention.
Figure 12:
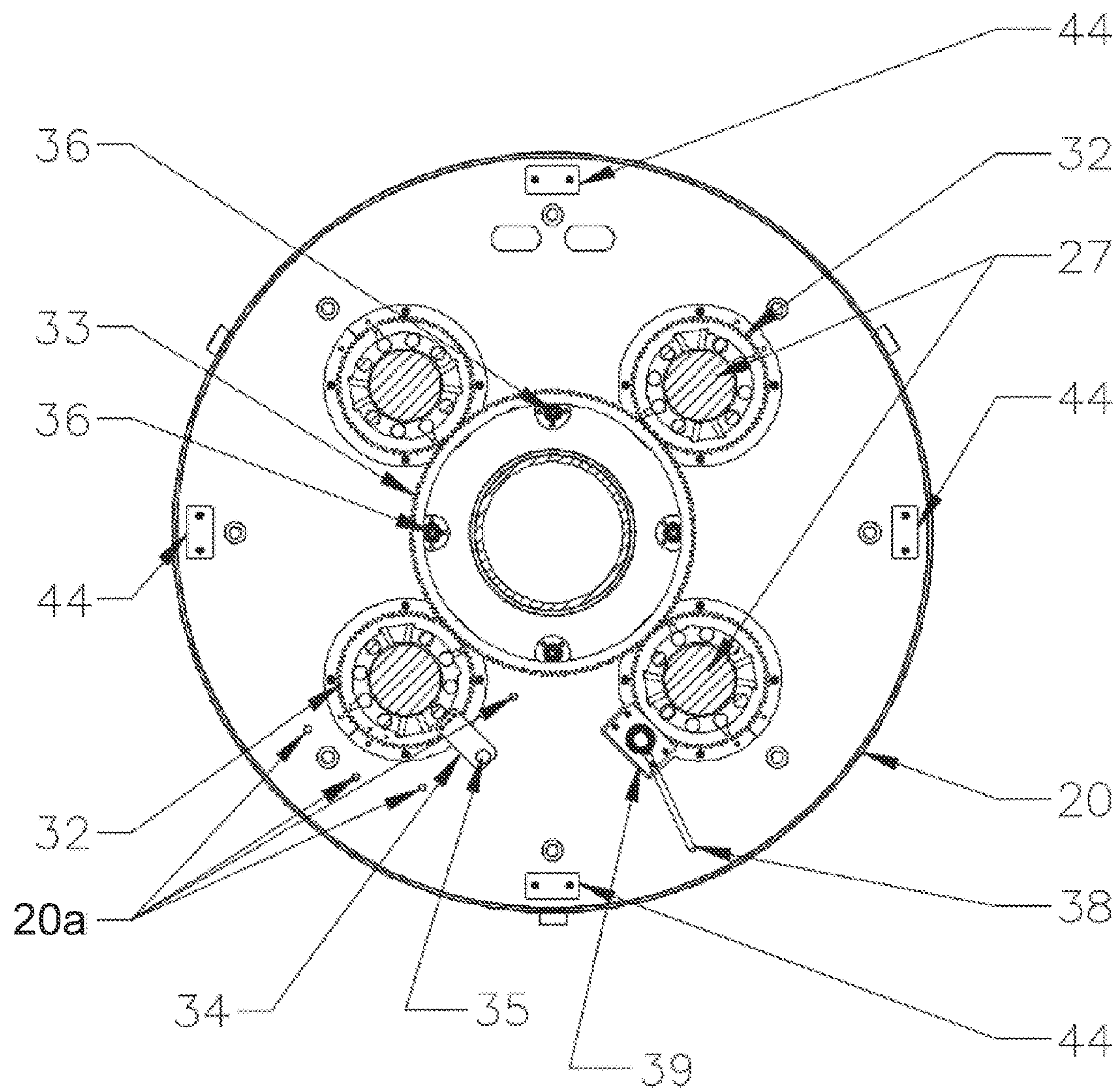
FIG. 12 illustrates top view of the squeeze retract stop assembly according to the second implementation of the present invention.

In second implementation, the FIGS. 11 and 12 illustrates the isometric and top view of a first alternate configuration of the squeeze retract stop assembly, respectively. The main construction and operation of the alternative configuration is similar to the first embodiment. However, instead of an indexing barrel (29) with vertical steps, an indexing plate (57) can be mounted with spacers (58) of different heights to achieve the same function.

Figure 13:
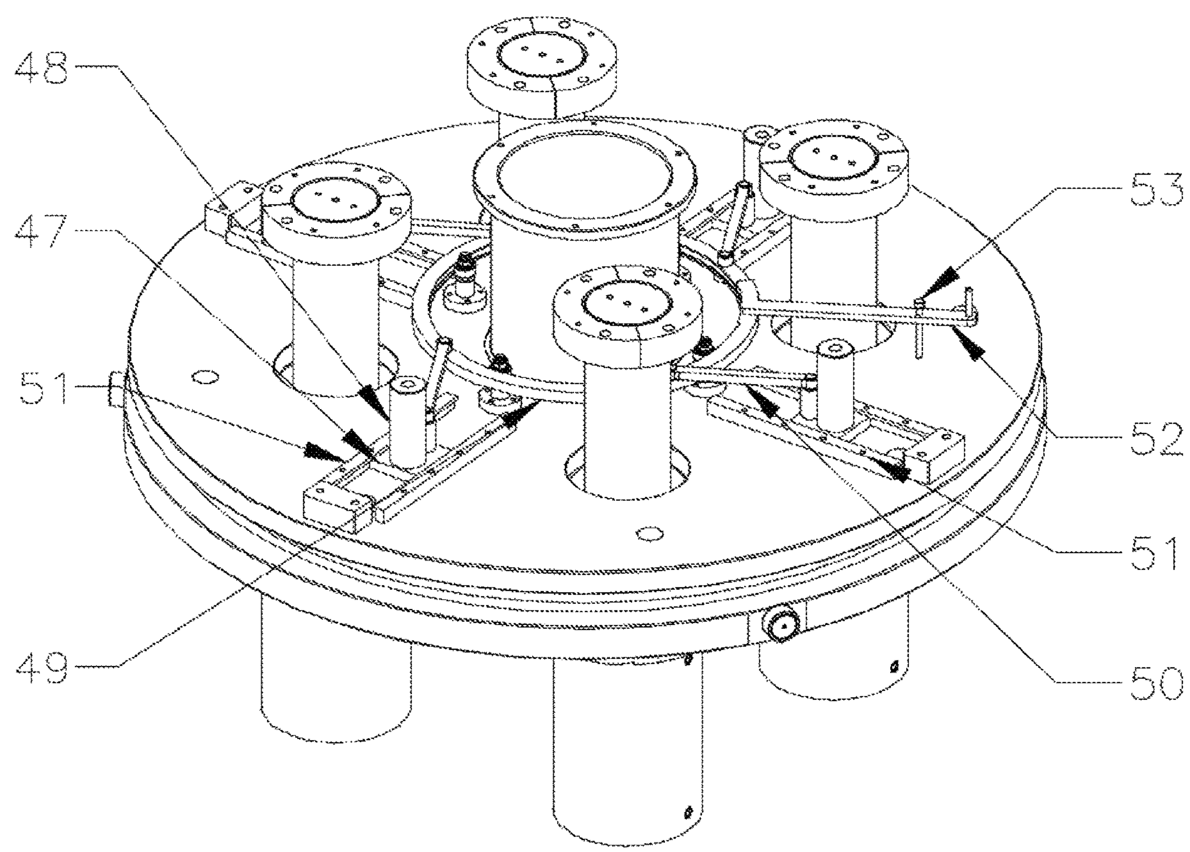
FIG. 13 illustrates the isometric view of the squeeze retract stop assembly according to the third implementation of the present invention.
Figure 14:
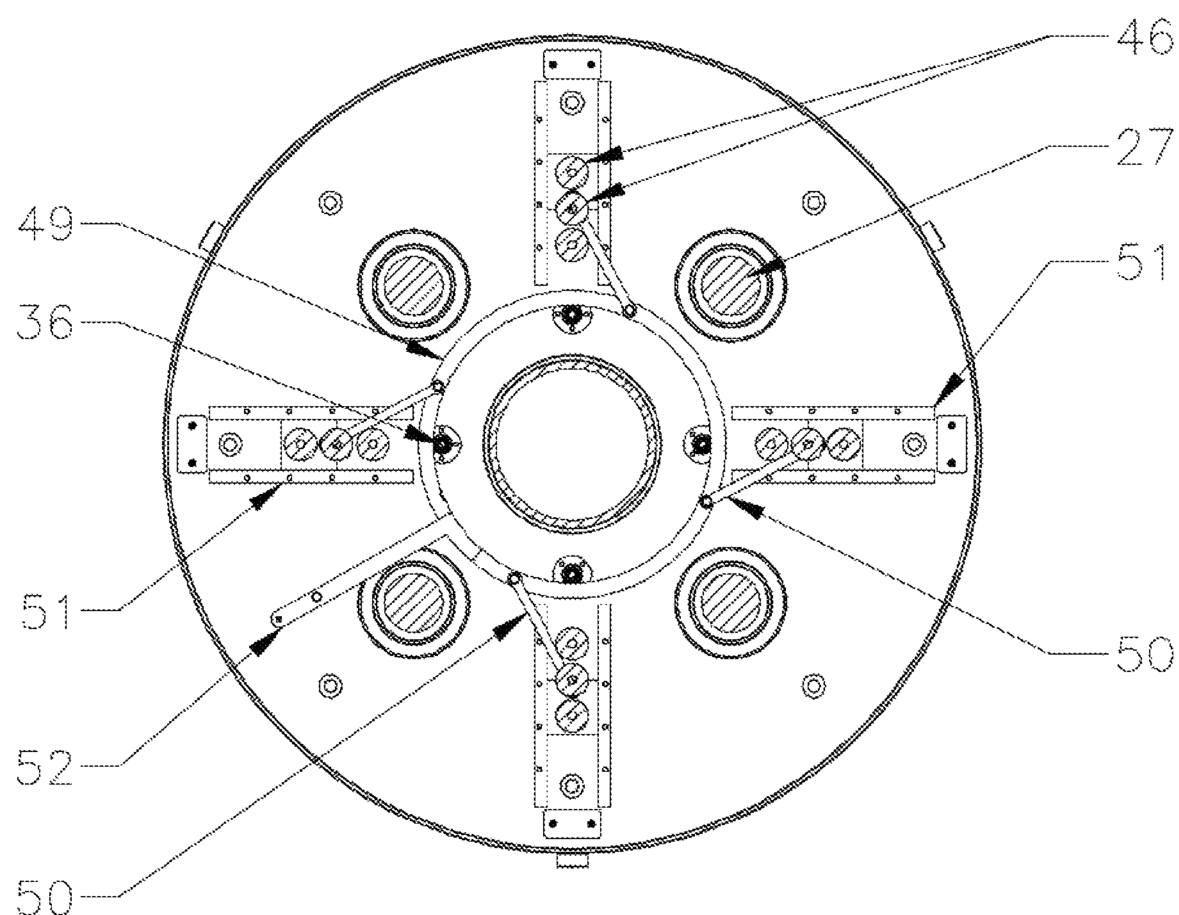
FIG. 14 illustrates top view of the squeeze retract stop assembly according to the third implementation of the present invention.
Figure 15:
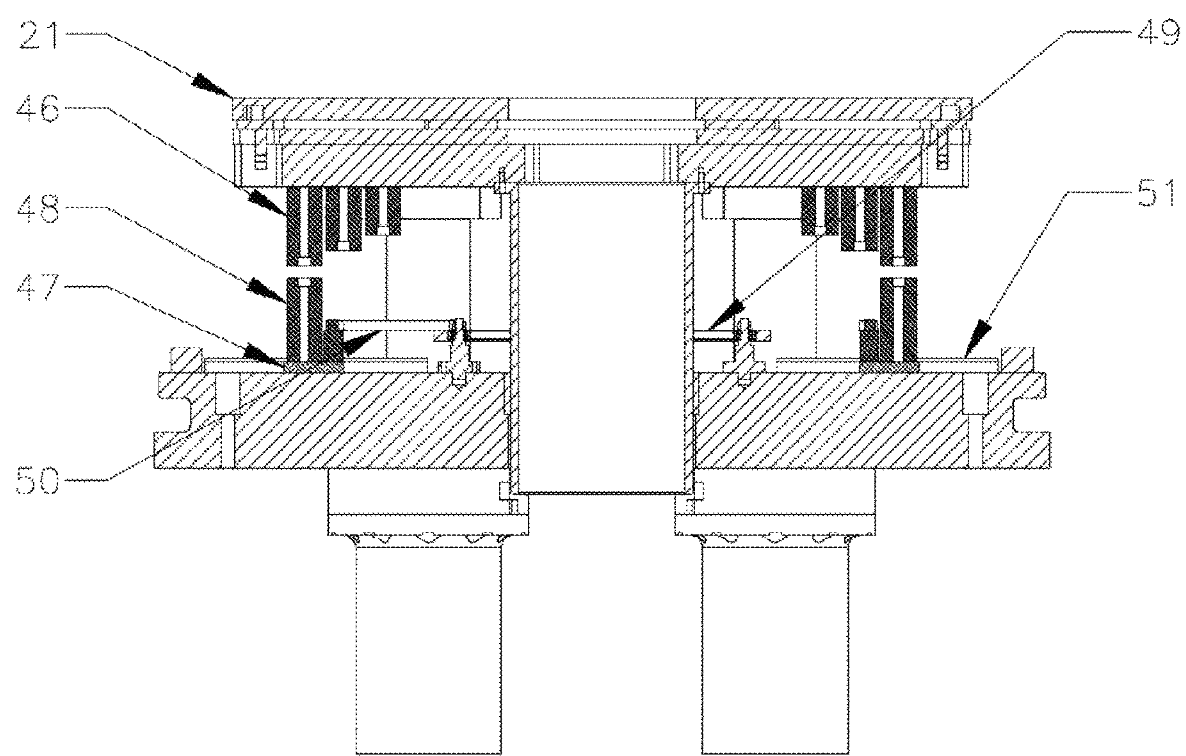
FIG. 15 illustrates the cross-sectional view of the squeeze retract stop assembly according to the third implementation of the present invention.

In the third implementation, the FIG. 13 illustrates the isometric view of an second alternate configuration of the squeeze retract stop assembly, FIG. 14 illustrates the top view of an alternate configuration 2 of the squeeze retract stop assembly and FIG. 15 illustrates the cross-sectional view of an second alternate configuration of the squeeze retract stop assembly. This arrangement utilizes multiple cylindrical stopper blocks (46) with different heights mounted to the bottom heat plates (21). A sliding plate (47) mounted with a single squeeze retract stop (48) engages with either of the stopper blocks (46) depending on the mold heights when a loss of squeeze pressure is developed in the squeeze cylinder (24). The linear movement of the squeeze retract stop (48) is achieved by the rotation of an actuator ring (49) and connecting links (50) fixed to the sliding plate (47). The sliding plate (47) is guided by slide plate guides (51). The slide plates (47) position is indexed and held in position by an indexing lever (52) and lever lock pin (53).

Figure 16:
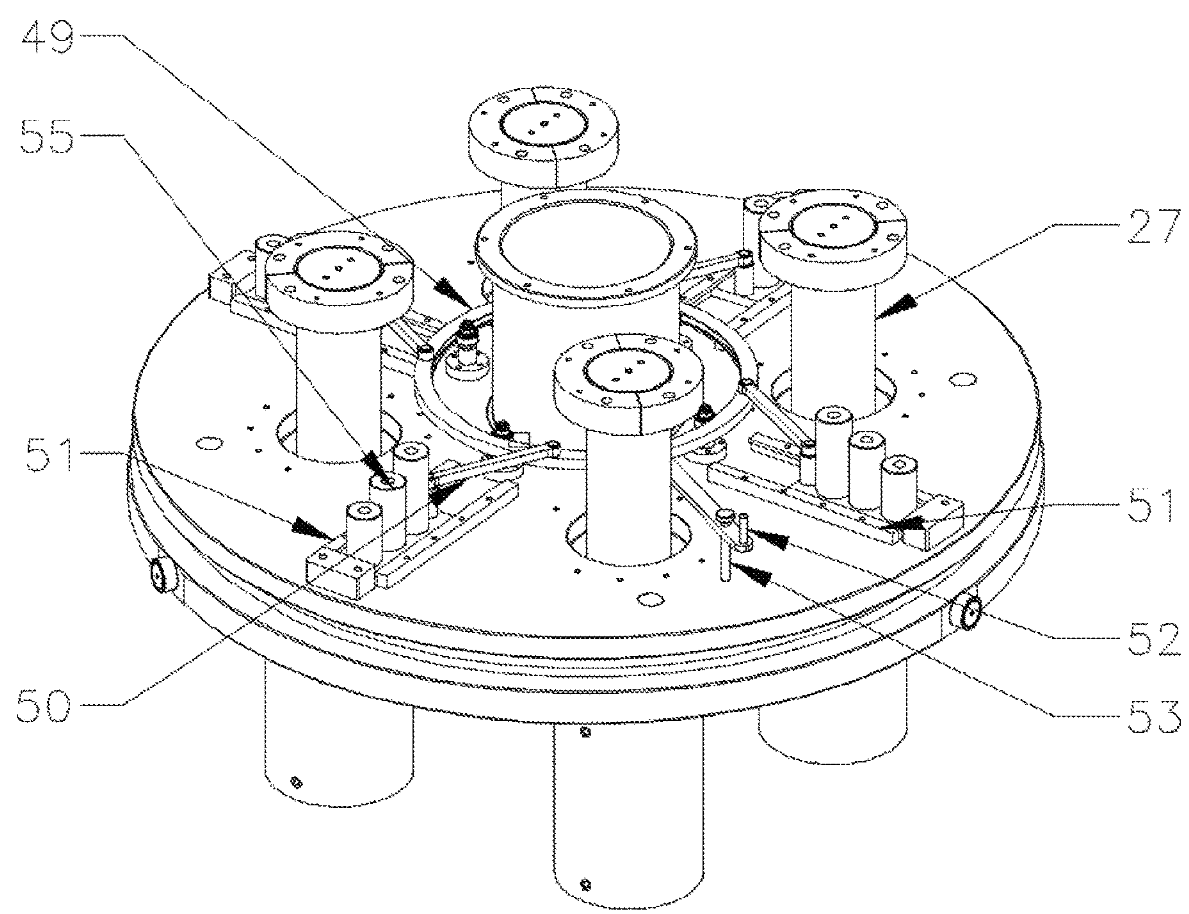
FIG. 16 illustrates Isometric view of the squeeze retract stop assembly according to the fourth implementation of the present invention.
Figure 17:
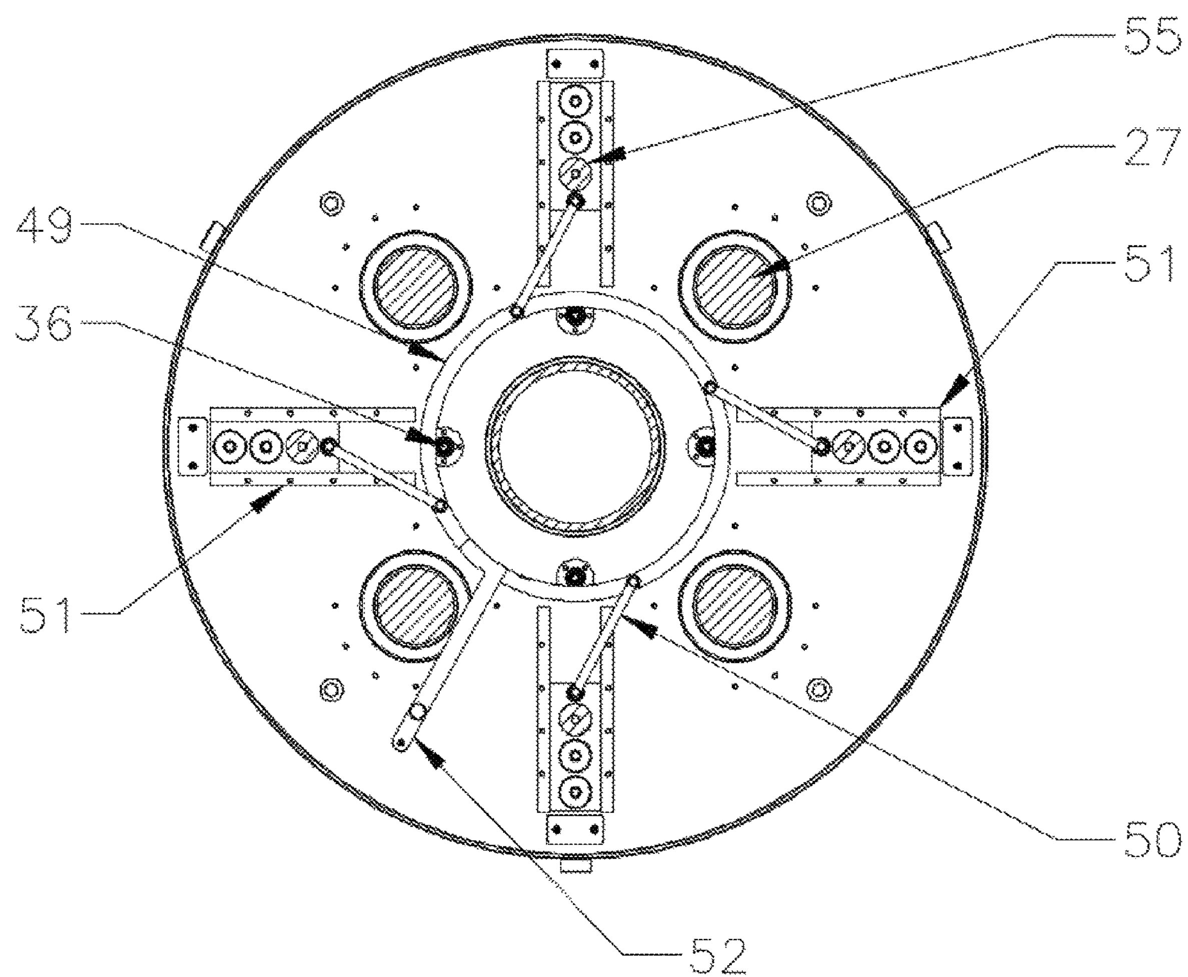
FIG. 17 illustrates top view of the squeeze retract stop assembly according to the fourth implementation of the present invention.
Figure 18:
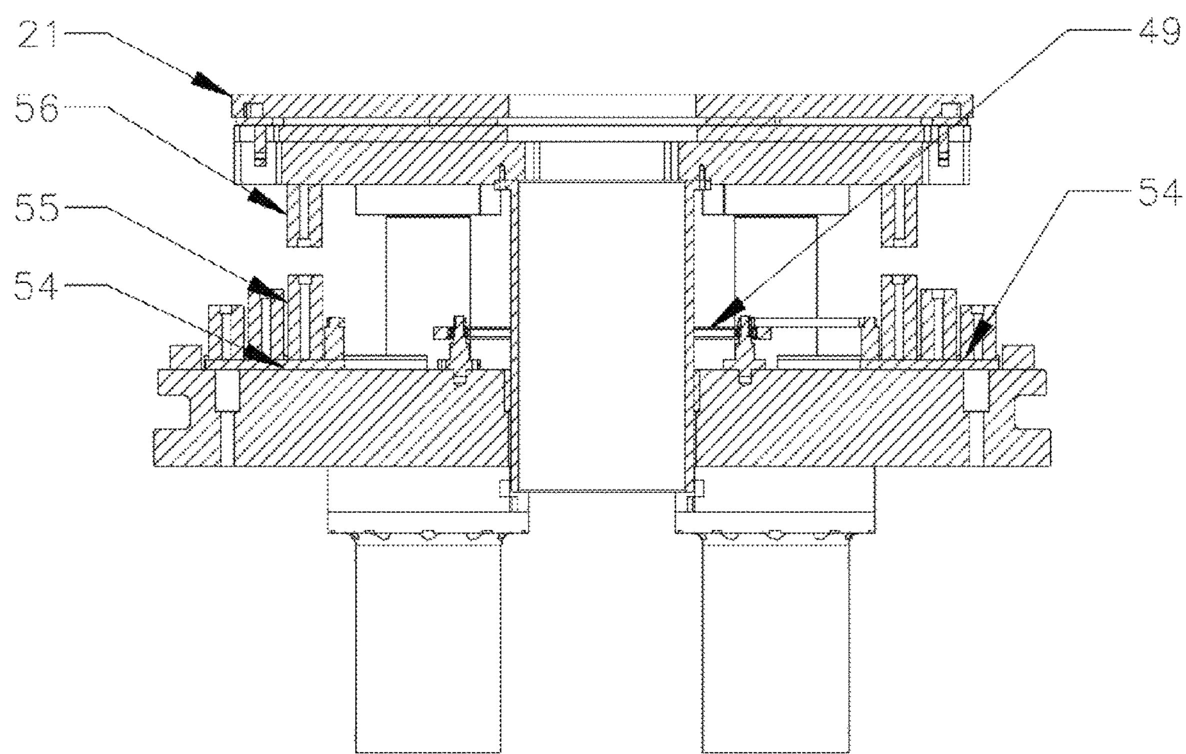
FIG. 18 illustrates Cross-sectional view of the squeeze retract stop assembly according to the fourth implementation of the present invention.

In fourth implementation, the FIG. 16 illustrates the isometric view of an third alternate configuration of the squeeze retract stop assembly, FIG. 17 illustrates top view of an alternate configuration 3 of the squeeze retract stop assembly and FIG. 18 illustrates Cross-sectional view of an alternate configuration 3 of the squeeze retract stop. FIGS. 16, 17, 18 represent alternate configuration 3 for the squeeze retract stop. This arrangement is similar to the assembly shown in FIGS. 13, 14, 15. The slide plate (54) instead of a single retract stop uses multiple retract stops (55) at different heights. These retract stops (55) engage with a single cylindrical stopper block (56) mounted to the bottom heat plates (21). The linear movement of the sliding plate (54) is ensured by an actuator ring (49), connecting links (50) and plate guides (51). The slide plates (54) position is indexed and held in position by an indexing lever (52) and lever lock pin (53).

Figure 19:
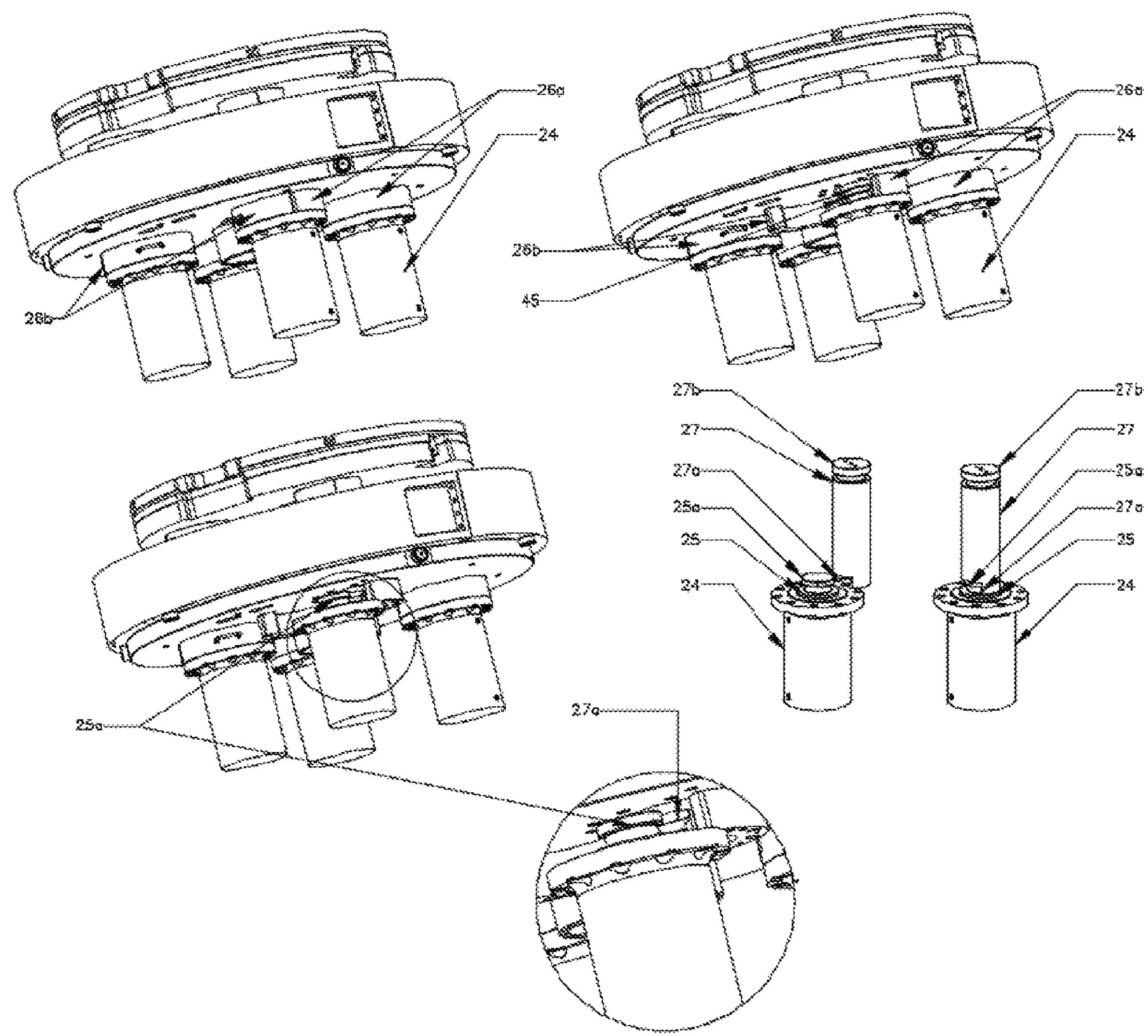
FIG. 19 illustrates Squeeze cylinder removal arrangement according to one implementation of the present invention.

In one implementation, the FIG. 19 illustrates the squeeze cylinder removal arrangement for easy squeeze cylinder assembly and disassembly. The squeeze cylinders (24) along with the squeeze cylinder spacers (26) are fastened to the bottom bolster (20). The extended flange (24 *a*) portion of the squeeze cylinder piston rod (25) engages with T slot (27 *a*) in piston rod spacers. Spacer Flange (27 *b*) at the other end of piston rod spacer (27) engages with piston rod spacer retainer (28). Squeeze cylinder spacer (26) is made up of two split halves, first split half (26*a*) is fixed to bottom bolster by fasteners. Second split half (26*b*) is hinged to first split half. Second split half can be rotated around hinge pin (45) by a handle welded to it. Once rotated, squeeze cylinder (24) can be removed from the second split half side, after removing fasteners. For assembling it back, squeeze cylinder (24) to be pushed from side till the extended flange (25*a*) engages with the T slot (27*a*) in piston rod spacer (27). The second split half (26*b*) can be closed back and squeeze cylinder (24) along with squeeze cylinder spacer (26) can be fastened to bottom bolster (20).

Some of the important features of the present invention, considered to be noteworthy are mentioned below:

1. The mold height adjusting assembly has an indexing barrel with vertical steps at different heights to accommodate tires of varying sizes.
2. The piston rod spacer retainer, made up of two split halves has an extended teeth per split half in its construction which engages with the vertical steps of the indexing barrel to prevent further downward movement of the bottom mold and thereby keeping it to a minimum to prevent any undesirable condition.
3. An additional locking mechanism associated with the arrangement for locking the indexing barrel at the exact required angle such that the discrete vertical step engages with the piston rod spacer retainer.
4. The indexing ring and upper housing and the indexing barrel and squeeze cylinder piston rods, piston rod spacer, piston rod spacer retainer is used simultaneously to achieve the desired mold height between the top and bottom heat plates.
5. The advantages of an indexing barrel mechanism over the nut-screw arrangement is that, a relatively low setup time is required for achieving different mold heights and lesser inventory of parts required.
6. The squeeze cylinder removal arrangement provides easy hydraulic squeeze cylinder assembly and disassembly.

Although a hydraulic tire curing press apparatus has been described in language specific to structural features and/or methods, it is to be understood that the embodiments disclosed in the above section are not necessarily limited to the specific features or methods or devices described. Rather, the specific features are disclosed as examples of implementations of the improved hydraulic tire curing press apparatus.

The invention claimed is:

1. A hydraulic tire curing press apparatus for shaping and curing tires, wherein said apparatus comprises:

an upper press cavity including a vertically separable upper housing, and a top mold fastened to the upper housing;

a lower press cavity mounted on a base and capable of providing mold height adjustment during a tire curing process, wherein said base comprises a bottom bolster structure, and a bottom mold, said bottom bolster structure comprises:

an indexing lock ring rotatably arranged with said bottom bolster structure to facilitate engagement or disengagement of said top mold with said bottom mold;

a plurality of hydraulic squeeze cylinders, wherein each squeeze cylinder includes a squeeze cylinder piston rod to move the bottom mold thereby providing mold height adjustment;

a squeeze retract stop assembly adapted to restrict downward movement of said bottom mold during the tire curing process;

a locking arrangement comprising at least one locking lever and at least one indexing lock pin, wherein said at least one indexing lock pin is adapted to connect said at least one locking lever to any one of a plurality of lock holes in said bottom bolster structure, wherein each lock hole corresponds to a particular mold height; and said indexing lock ring has a bottom profile engaged to a groove in the bottom bolster structure and a top profile engaging with said upper housing and holding said upper housing in position during the tire curing process.

2. The apparatus as claimed in claim 1, wherein said squeeze retract stop assembly comprises a plurality of indexing barrels mounted on said bottom bolster structure and rotatably held in a position by a barrel retainer.

3. The apparatus as claimed in claim 2, wherein each indexing barrel includes a plurality of vertical steps at different heights for different mold height adjustment.

4. The apparatus as claimed in claim 3, wherein each indexing barrel associated with an indexing gear arrangement is coupled to an indexing ring gear.

5. The apparatus as claimed in claim 1, wherein the squeeze cylinder piston rod includes an extended flange portion that engages with a T-slot in a piston rod spacer.

6. The apparatus as claimed in claim 5, wherein said piston rod spacer includes a spacer flange that engages with a piston rod spacer retainer.

7. The apparatus as claimed in claim 1, wherein each squeeze cylinder includes a squeeze cylinder spacer made up of a first split half fixed to said bottom bolster structure, and a second split half rotatably hinged to said first split half.

8. The apparatus as claimed in claim 6, wherein said piston rod spacer retainer includes extended teeth and a split flange.

9. The apparatus as claimed in claim 8, wherein vertical steps of each indexing barrel comes in contact with the extended teeth to prevent further downward movement of the bottom mold.

10. The apparatus as claimed in claim 4, wherein said at least one indexing lock pin is locked with any one of said plurality of lock holes to prevent further rotation of said indexing gear, said indexing ring gear, an indexing pinion, and each of said plurality of indexing barrels, and locks each of said plurality of indexing barrels at a required angle such that a discrete vertical step of the plurality of vertical steps of each indexing barrel engages with an extended tooth of the piston rod spacer retainer.

11. The apparatus as claimed in claim 1, wherein said squeeze retract stop assembly comprises a plurality of indexing plates mounted with spacers of different heights for different mold height adjustment.

12. The apparatus as claimed in claim 1, wherein said squeeze retract stop assembly comprises an arrangement of a plurality of cylindrical stopper blocks with different heights mounted to bottom heat plates.

13. The apparatus as claimed in claim 12, wherein said arrangement further comprises a sliding plate mounted with a squeeze retract stop engaged with one of said cylindrical stopper blocks according to a desired mold height.

14. The apparatus as claimed in claim 13, wherein linear movement of said squeeze retract stop fixed to the sliding plate is achieved by rotation of an actuator ring and connecting links.

15. The apparatus as claimed in claim 13, wherein the sliding plate is guided by plate guides and indexed and held by an indexing lever and a lever lock pin.

16. The apparatus as claimed in claim 13, wherein the sliding plate has multiple retract stops at different heights engaging with a single cylindrical stopper block mounted to the bottom heat plates.

17. The apparatus as claimed in claim 1, wherein a stroke of each squeeze cylinder covers an entire range of a required mold height adjustment.

18. A hydraulic tire curing press apparatus for shaping and curing tires, wherein said apparatus comprises:

an upper press cavity including a vertically separable upper housing, and a top mold fastened to the upper housing;

a lower press cavity mounted on a base and capable of providing mold height adjustment during a tire curing process, wherein said base comprises a bottom bolster structure, and a bottom mold, said bottom bolster structure comprises:

an indexing lock ring rotatably arranged with said bottom bolster structure to facilitate engagement or disengagement of said top mold with said bottom mold;

a plurality of hydraulic squeeze cylinders, wherein each squeeze cylinder includes a squeeze cylinder piston rod to move the bottom mold thereby providing mold height adjustment;

a squeeze retract stop assembly adapted to restrict downward movement of said bottom mold during the tire curing process, said squeeze retract stop assembly further comprises a plurality of indexing barrels rotatably held by an indexing barrel retainer and fastened to said bottom bolster structure, wherein each indexing barrel includes a plurality of vertical steps at different heights for different mold heights, wherein, said vertical steps of each indexing barrel engages with extended teeth of a piston rod spacer retainer assembly to restrict the further downward movement of said bottom mold;

at least one indexing pinion rotatably mounted on an indexing pinion bracket; and at least one ratchet adapted to rotate the at least one indexing pinion, which in turn rotates said indexing barrel through a gear arrangement; and a locking arrangement comprising at least one locking lever and at least one indexing lock pin, wherein said at least one indexing lock pin is adapted to connect said at least one locking lever to any one of a plurality of lock holes in said bottom bolster structure, wherein each lock hole corresponds to a particular mold height.

19. The apparatus as claimed in claim 18, wherein said gear arrangement includes a plurality of indexing gears, each per indexing barrel, and said indexing gears are coupled to an indexing ring gear.

20. The apparatus as claimed in claim 19, wherein said indexing ring gear is mounted using a set of ring pins with bearings which enable free rotation of said indexing ring gear.

21. The apparatus as claimed in claim 19, wherein rotation of said at least one indexing pinion enables rotation of said indexing ring gear thereby causing rotation of said indexing gears which in turn rotates each indexing barrel in position.

22. The apparatus as claimed in claim 18, wherein said piston rod spacer retainer assembly includes an extended tooth and a split flange.

23. The apparatus as claimed in claim 18, wherein said vertical steps of each indexing barrel comes in contact with said extended teeth to prevent further downward movement of the bottom mold.

24. The apparatus as claimed in claim 18, wherein said at least one locking lever is connected to at least one indexing gear in said gear arrangement and said at least one indexing gear is connected to at least one of said plurality of indexing barrels by using a key.

* * * * *